United States Patent
Roh et al.

(10) Patent No.: US 10,546,178 B2
(45) Date of Patent: Jan. 28, 2020

(54) FINGERPRINT VERIFICATION METHOD AND ELECTRONIC DEVICE FOR PERFORMING THE SAME

(71) Applicant: Samsung Electronics Co., Ltd., Suwon-si, Gyeonggi-do (KR)

(72) Inventors: Wan Ho Roh, Seoul (KR); So Young Kim, Suwon-si (KR); Dae Kwang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/374,159

(22) Filed: Apr. 3, 2019

(65) Prior Publication Data

US 2019/0228207 A1  Jul. 25, 2019

Related U.S. Application Data

(63) Continuation of application No. 15/482,098, filed on Apr. 7, 2017, now Pat. No. 10,262,184.

(30) Foreign Application Priority Data

Apr. 27, 2016 (KR) ........................ 10-2016-0051236

(51) Int. Cl.
*G06K 9/00* (2006.01)
*G06F 21/32* (2013.01)
(Continued)

(52) U.S. Cl.
CPC ....... *G06K 9/00087* (2013.01); *G06F 3/0412* (2013.01); *G06F 3/0488* (2013.01);
(Continued)

(58) Field of Classification Search
CPC ............. G06F 2203/0338; G06F 21/32; G06F 3/0488; G06K 9/00006
(Continued)

(56) References Cited

U.S. PATENT DOCUMENTS 6,647,133 B1 * 11/2003 Morita ............... G06K 9/00013
340/562
7,020,308 B1  3/2006 Shinzaki et al.
(Continued)

FOREIGN PATENT DOCUMENTS

EP  2 230 623 A1  9/2010
EP  3 032 385 A1  6/2016
(Continued)

*Primary Examiner* — Yosef Kassa
(74) *Attorney, Agent, or Firm* — Jefferson IP Law, LLP

(57) ABSTRACT

An electronic device is provided. The electronic device includes a touchscreen display, a pressure sensor positioned to sense external pressure against the display, a fingerprint sensor positioned to detect a fingerprint on at least a portion of the display, a processor electrically coupled to the display, the pressure sensor, and the fingerprint sensor, and a memory electrically coupled to the processor, in which the memory stores at least one registered fingerprint. The processor is configured to sense pressure of a user's finger against the display using the pressure sensor, upon sensing of the pressure, activate the fingerprint sensor, detect a fingerprint of the finger using the fingerprint sensor, determine whether the detected fingerprint is matched with any of the at least one registered fingerprint, and perform a preselected function without further requiring authentication, when the detected fingerprint is matched with any of the at least one registered fingerprint.

20 Claims, 17 Drawing Sheets

(51) Int. Cl.
*G06F 3/0488* (2013.01)
*G06F 3/041* (2006.01)
*H04M 1/725* (2006.01)
*H04L 12/58* (2006.01)
*G06F 3/01* (2006.01)

(52) U.S. Cl.
CPC .............. *G06F 21/32* (2013.01); *H04L 51/04* (2013.01); *H04M 1/72519* (2013.01); *G06F 3/016* (2013.01); *G06F 3/0416* (2013.01); *G06F 2203/04105* (2013.01); *G06K 9/00013* (2013.01); *H04M 2250/22* (2013.01)

(58) Field of Classification Search
USPC ................ 382/115, 116, 124, 128, 209, 278; 340/5.81, 5.82, 5.83
See application file for complete search history.

(56) References Cited

U.S. PATENT DOCUMENTS

| | | | |
|---|---|---|---|
| 7,110,577 B1 | 9/2006 | Tschudi | |
| 7,116,805 B2 * | 10/2006 | Machida | G06K 9/00026 382/124 |
| 7,381,941 B2 | 6/2008 | Cheng et al. | |
| 7,505,611 B2 * | 3/2009 | Fyke | G06F 1/1626 382/124 |
| 8,019,131 B2 | 9/2011 | Wong et al. | |
| 8,031,094 B2 * | 10/2011 | Hotelling | H03M 3/494 341/139 |
| 8,077,147 B2 * | 12/2011 | Krah | G06F 3/016 345/163 |
| 8,443,199 B2 | 5/2013 | Kim et al. | |
| 8,599,150 B2 * | 12/2013 | Philipp | G06F 3/044 178/18.01 |
| 8,605,960 B2 | 12/2013 | Orsley | |
| 8,719,584 B2 | 5/2014 | Mullin | |
| 8,723,643 B2 | 5/2014 | Wang et al. | |
| 8,854,325 B2 | 10/2014 | Byrd et al. | |
| 8,949,618 B1 | 2/2015 | Lee et al. | |
| 9,111,125 B2 * | 8/2015 | Westerman | G06K 9/00013 |
| 9,202,100 B2 | 12/2015 | Wolfer et al. | |
| 9,547,789 B2 | 1/2017 | Park et al. | |
| 2008/0253624 A1 | 10/2008 | Wong et al. | |
| 2010/0240415 A1 | 9/2010 | Kim et al. | |
| 2013/0287272 A1 | 10/2013 | Lu et al. | |
| 2015/0271175 A1 | 9/2015 | Je et al. | |
| 2015/0277652 A1 | 10/2015 | Kim | |
| 2015/0363632 A1 | 12/2015 | Ahn et al. | |
| 2016/0034117 A1 | 2/2016 | Kim et al. | |
| 2016/0171281 A1 | 6/2016 | Park et al. | |

FOREIGN PATENT DOCUMENTS

| | | |
|---|---|---|
| KR | 10-2011-0108646 A | 10/2011 |
| KR | 10-2015-0072923 A | 6/2015 |
| KR | 10-2015-0092479 A | 8/2015 |
| WO | 2016/018085 A1 | 2/2016 |

\* cited by examiner

FINGERPRINT VERIFICATION METHOD AND ELECTRONIC DEVICE FOR PERFORMING THE SAME

CROSS-REFERENCE TO RELATED APPLICATION(S)

This application is a continuation application of prior application Ser. No. 15/482,098, filed on Apr. 7, 2017, which claims priority under 35 U.S.C. § 119(a) of a Korean patent application number 10-2016-0051236, filed on Apr. 27, 2016, in the Korean Intellectual Property Office, the entire disclosure of which is incorporated by reference hereby in its entirety.

TECHNICAL FIELD

The present disclosure relates to fingerprint verification methods and electronic devices for performing the same.

BACKGROUND

Recently, as mobile communication technologies have been developed, electronic devices have been changed into structures for freely accessing wired/wireless communication networks while being easily carried. For example, electronic devices, such as smartphones or tablet personal computers (PCs), may support not only telephone conversations and message transceiving functions, but also various functions based on application programs which are installed in the electronic devices.

Since the electronic devices may support various functions related to user's daily life, the electronic devices may store user's private information. Accordingly, the electronic devices may have various security ways, such as personal identification number (PIN) authentication, pattern authentication, and the like, against the loss of the electronic devices.

As one of the security ways, biometrics may be applied to the electronic devices. In other words, the biometrics employs biological features including a fingerprint, a face, an iris, a vein, and the like. Among the biological features, the fingerprint of a person is generally unique and hardly changed over the lifetime of the person.

To verify the fingerprint, the electronic device may include a fingerprint sensor. The fingerprint sensor may be disposed in a specified area (e.g., a home key) of the electronic device. Accordingly, since a user mainly interacting with the electronic device through a touchscreen display has to alternately move a user's finger between the fingerprint sensor and the touchscreen display, the electronic device may be inefficiently operated.

In addition, generally, it is necessary to activate the electronic device prior to verifying the fingerprint. Accordingly, when the electronic device is in an idle mode or a sleep mode, it is necessary for a user to press a home button or a power button prior to verifying the fingerprint and to switch the mode of the electronic device to an active mode or a wake-up mode such that the fingerprint is verified.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of activating a fingerprint sensor included in a display based on a pressure value sensed by a pressure sensor and of performing various functions depending on a fingerprint verification result from the fingerprint sensor, and an electronic device for performing the method.

In accordance with an aspect of this disclosure, an electronic device is provided. The electronic device includes a housing including a first surface facing in a first direction, and a second surface facing in a second direction opposite from the first direction, a touchscreen display interposed between the first and second surfaces, and exposed through the first surface, a pressure sensor interposed between the first and second surfaces, in which the pressure sensor is positioned to sense pressure of an external object against the touchscreen display, a fingerprint sensor interposed between the first and second surfaces and positioned to detect a fingerprint on at least a portion of the touchscreen display, at least one processor positioned inside the housing and electrically coupled to the touchscreen display, the pressure sensor, and the fingerprint sensor, and a memory positioned inside the housing and electrically coupled to the at least one processor, in which the memory stores at least one registered fingerprint. The memory may store instructions that, when executed, cause the at least one processor to sense pressure of a user's finger against the touchscreen display using the pressure sensor, activate the fingerprint sensor upon sensing of the pressure, detect a fingerprint of the user's finger using the fingerprint sensor, determine whether the detected fingerprint is matched with a registered fingerprint of the at least one registered fingerprint, and perform a preselected function without further requiring authentication, when the detected fingerprint is matched with any registered fingerprint of the at least one registered fingerprint.

In accordance with another aspect of this disclosure, an electronic device is provided. The electronic device includes a touchscreen display, a pressure sensor configured to sense pressure applied to the touchscreen display by a user's finger, a fingerprint sensor configured to detect a fingerprint of the user's finger, at least one processor electrically coupled to the touchscreen display, the pressure sensor, and the fingerprint sensor, and a memory electrically coupled to the at least one processor and positioned to store at least one registered fingerprint. The processor may sense the pressure, which is applied to the touchscreen display by the user's finger, using the pressure sensor, activate the fingerprint sensor when the sensed pressure is equal to or greater than a designated value, detect the fingerprint of the user's finger using the fingerprint sensor, compare the detected fingerprint with the at least one registered fingerprint, and perform a first function when the detected fingerprint is matched with a registered fingerprint of the at least one registered fingerprint, and perform a second function different from the first function when the detected fingerprint is not matched with any registered fingerprint of the at least one registered fingerprint.

In accordance with another aspect of this disclosure, a fingerprint verification method is provided. The fingerprint verification method includes sensing pressure of a user's finger against a touchscreen display, activating a fingerprint sensor upon sensing of the pressure, detecting a fingerprint of the user's finger using the fingerprint sensor, determining whether the detected fingerprint is matched with a registered fingerprint of at least one registered fingerprint stored in the electronic device, and performing a preselected function without further requiring authentication, when the detected fingerprint is matched with any registered fingerprint of the at least one registered fingerprint.

In accordance with another aspect of this disclosure, a fingerprint verification method is provided. The fingerprint verification method includes sensing pressure, which is applied to a touchscreen display by a user's finger, using a pressure sensor, activating a fingerprint sensor when the sensed pressure is equal to or greater than a designated value, detecting the fingerprint of the user's finger using the fingerprint sensor, comparing the detected fingerprint with at least one registered fingerprint stored in a memory, performing a first function when the detected fingerprint is matched with a registered fingerprint of the at least one the registered fingerprint, and performing a second function different from the first function when the detected fingerprint is not matched with any registered fingerprint of the at least one registered fingerprint.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
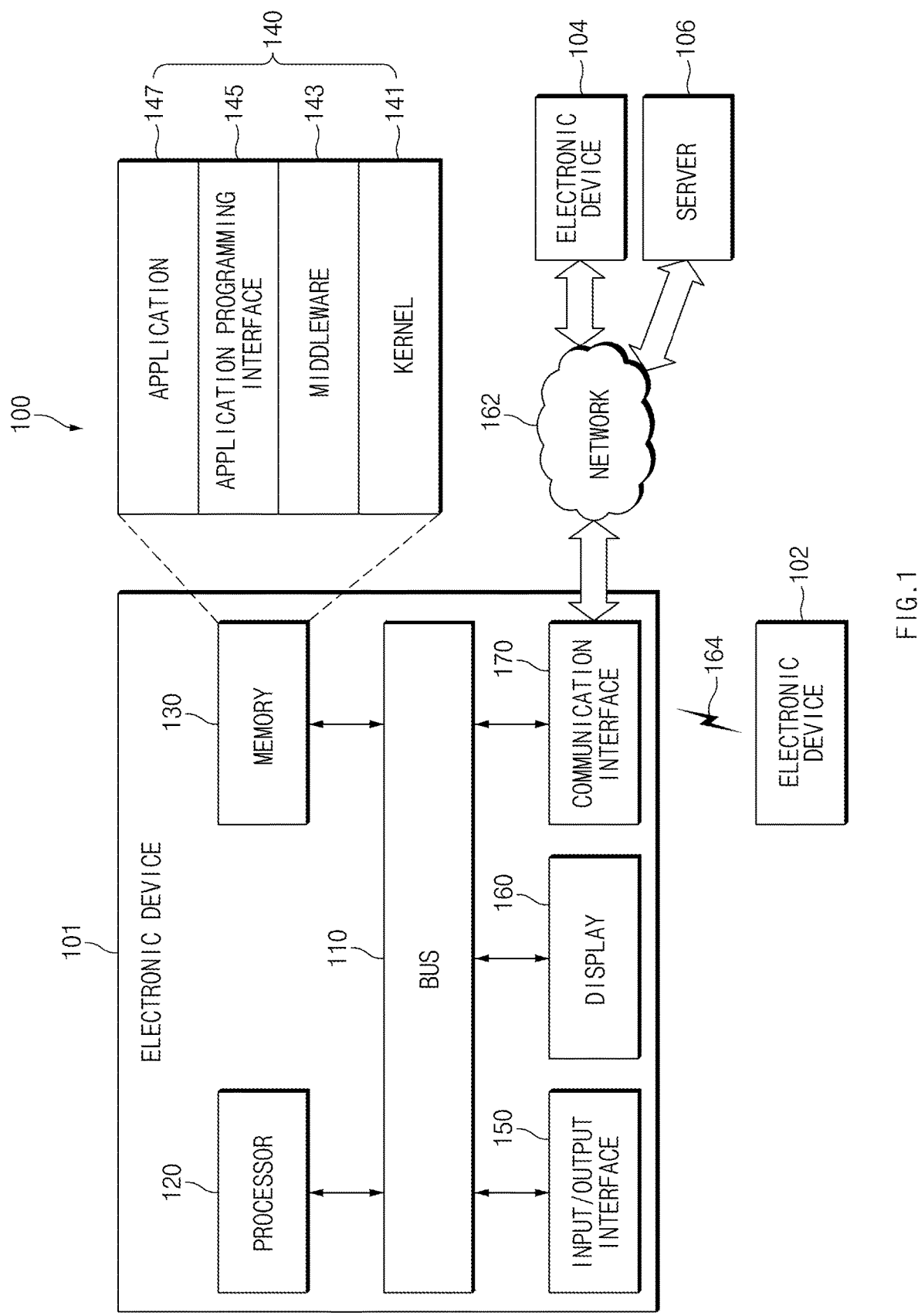
FIG. 1 illustrates an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have", "may have", "include" and "comprise", or "may include" and "may comprise" indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to different elements regardless of the order and/or the priority of the elements and to distinguish the relevant elements from other elements, but do not limit the elements. For example, "a first user device" and "a second user device" indicate mutually different user devices regardless of the order or the priority. For example, without departing the scope of this disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which executes corresponding operations by executing one or more software programs which are stored in a memory device.

Terms used in this disclosure are used to describe specified embodiments and are not intended to limit the scope of another embodiment. All the terms used herein, which include technical or scientific terms, may have the same meaning that is generally understood by those skilled in the art.

It will be further understood that terms, which are defined in a dictionary and commonly used, should also be interpreted as being customary in the relevant art and not in an idealized or overly formal unless expressly so defined in various embodiments of this disclosure. In some cases, even if certain terms are defined in the disclosure, they may not be interpreted to exclude various embodiments of this disclosure.

An electronic device according to various embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer-3 (MP3) players, mobile medical devices, cameras, or wearable devices. According to various embodiments of the present disclosure, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments of the present disclosure, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and Play Station™), electronic dictionaries, electronic keys, camcorders, electronic picture frames, and the like.

According to another embodiment of the present disclosure, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments of the present disclosure, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates a network environment 100 according to various embodiments of the present disclosure.

Referring to FIG. 1, an electronic device 101, 102, or 104 or a server 106 may be connected with each other over a network 162 or a short-range communication 164. The electronic device 101 may include a bus 110, a processor 120, a memory 130, an input/output interface 150, a display 160, and a communication interface 170. According to an embodiment of the present disclosure, the electronic device 101 may not include at least one of the above-described elements or may further include another element(s).

For example, the bus 110 may interconnect the above-described elements 110 to 170 and may include a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least one of other element(s) of the electronic device 101.

The memory 130 may include a volatile and/or nonvolatile memory. For example, the memory 130 may store instructions or data associated with at least one other element(s) of the electronic device 101. According to an embodiment of the present disclosure, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role of, for example, an interface which transmits an instruction or data input from a user or another external device, to other element(s) of the electronic device 101. Furthermore, the input/output interface 150 may output an instruction or data, received from another element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may include cellular communication employing at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like, as cellular communication protocol. According to an embodiment of the present disclosure, the wireless communication may include, for example, at least one of Wi-Fi, Bluetooth (BT), near field communication (NFC), magnetic stripe transmission (MST), radio frequency (RF), a body area network (BAN), and a global navigation satellite system (GNSS).

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (Beidou), or a European global satellite-based navigation system (Galileo) based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., local area network (LAN) or wide area network (WAN)), an internet, or a telephone network.

Each of the first and second external electronic devices 102 and 104 may be a device of which the type is different from or the same as that of the electronic device 101. According to an embodiment of the present disclosure, the server 106 may include a group of one or more servers. According to various embodiments of the present disclosure, all or a portion of operations performed in the electronic device 101 may be executed by another or plural electronic devices (e.g., the electronic devices 102 and 104 or the server 106). According to an embodiment of the present disclosure, in the case where the electronic device 101 executes any function or service automatically or in response to a request, the electronic device 101 may not perform the function or the service internally, but, alternatively additionally, it may request at least a portion of a function associated with the electronic device 101 at another device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
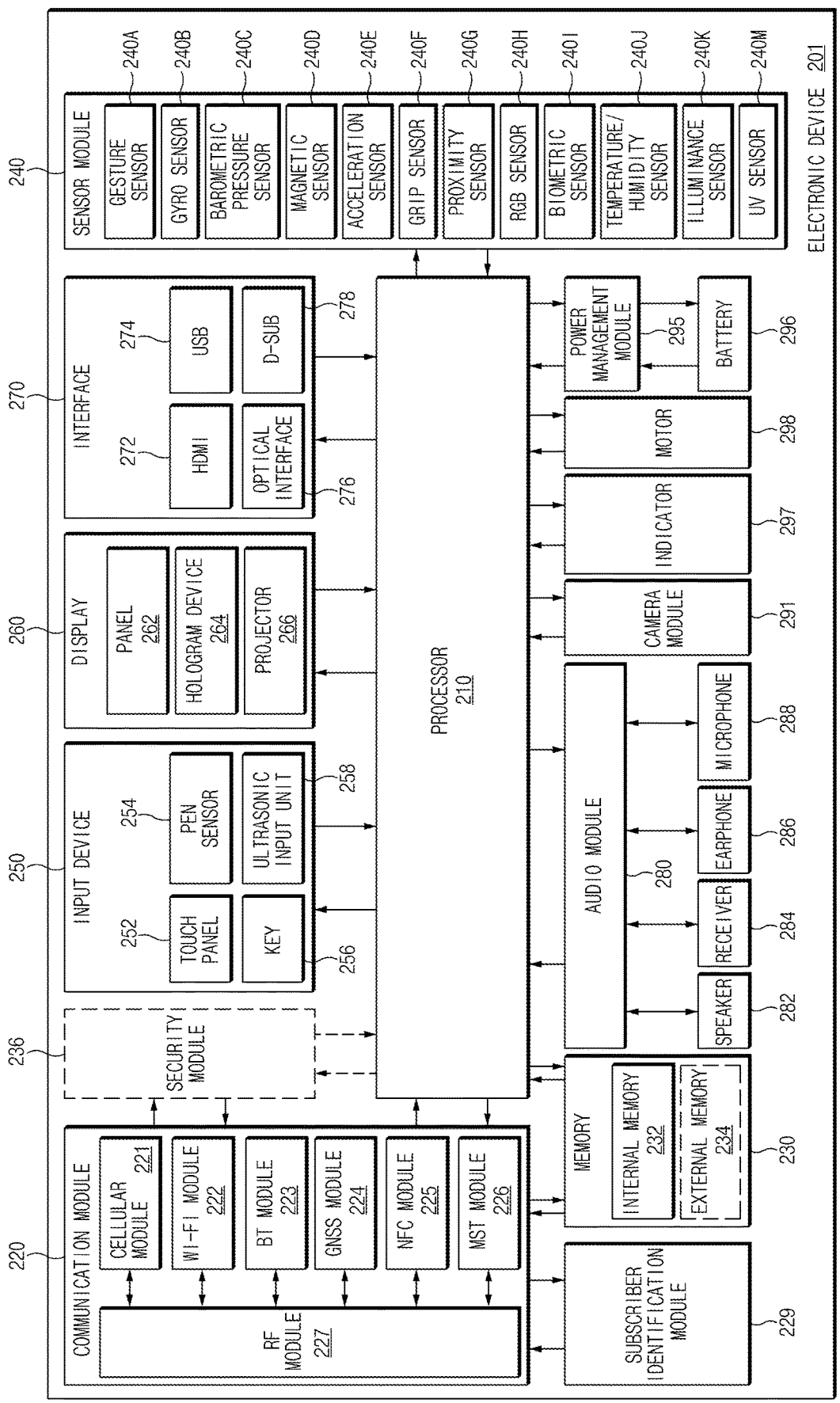
FIG. 2 illustrates a block diagram of an electronic device according to various embodiments of the present disclosure.

FIG. 2 illustrates a block diagram of an electronic device according to various embodiments of the present disclosure.

Referring to FIG. 2, an electronic device 201 may include, for example, an entire part or a part of the electronic device 101 illustrated in FIG. 1. The electronic device 201 may include one or more processors (e.g., an application processor (AP)) 210, a communication module 220, a subscriber identification module (SIM) 229, a memory 230, a sensor module 240, an input device 250, a display 260, an interface 270, an audio module 280, a camera module 291, a power management module 295, a battery 296, an indicator 297, and a motor 298.

The processor 210 may operate, for example, an operating system (OS) or an application to control a plurality of hardware or software elements connected to the processor 210 and may process and compute a variety of data. For example, the processor 210 may be implemented with a system on chip (SoC). According to an embodiment of the present disclosure, the processor 210 may further include a graphic processing unit (GPU) and/or an image signal processor (ISP). The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226, and a radio frequency (RF) module 227.

The cellular module 221 may provide, for example, voice communication, video communication, a character service, an internet service, or the like over a communication network. According to an embodiment of the present disclosure, the cellular module 221 may perform discrimination and authentication of the electronic device 201 within a communication network by using the subscriber identification module (e.g., a subscriber identity module (SIM) card) 229. According to an embodiment of the present disclosure, the cellular module 221 may perform at least a portion of functions that the processor 210 provides. According to an embodiment of the present disclosure, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment of the present disclosure, at least a part (e.g., two or more) of the cellular module 221, the Wi-Fi module 222, the BT module 223, the GNSS module 224, the NFC module 225, or the MST module 226 may be included within one integrated circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment of the present disclosure, at least one of the cellular module 221, the Wi-Fi module 222, the BT module 223, the GNSS module 224, the NFC module 225, or the MST module 226 may transmit and receive an RF signal through a separate RF module.

The subscriber identification module (SIM) 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask read only memory (ROM), a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red/green/blue (RGB) sensor), a biometric sensor 240I, a temperature/humidity sensor 240J, an illuminance sensor 240K, or an ultra-violet (UV) sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment of the present disclosure, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared (IR) and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment of the present disclosure, the panel 262 may include a pressure sensor (or force sensor) that measures the intensity of touch pressure by a user. The pressure sensor may be implemented integrally with the touch panel 252, or may be implemented as at least one sensor separately from the touch panel 252. According to an embodiment of the present disclosure, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally, or generally, the interface 270 may include, for example, a mobile high definition link (MHL) interface, a SD card/multi-media card (MMC) interface, or an infrared (IR) data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment of the present disclosure, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment of the present disclosure, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specified state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments described in this disclosure may be configured with one or more components, and the names of the elements may be changed according to the type of the electronic device. In various embodiments of the present disclosure, the electronic device may include at least one of the above-mentioned elements, and some elements may be omitted or other additional elements may be added. Furthermore, some of the elements of the electronic device according to various embodiments may be combined with each other so as to form one entity, and thus the functions of the elements may be performed in the same manner as before the combination.

Figure 3:
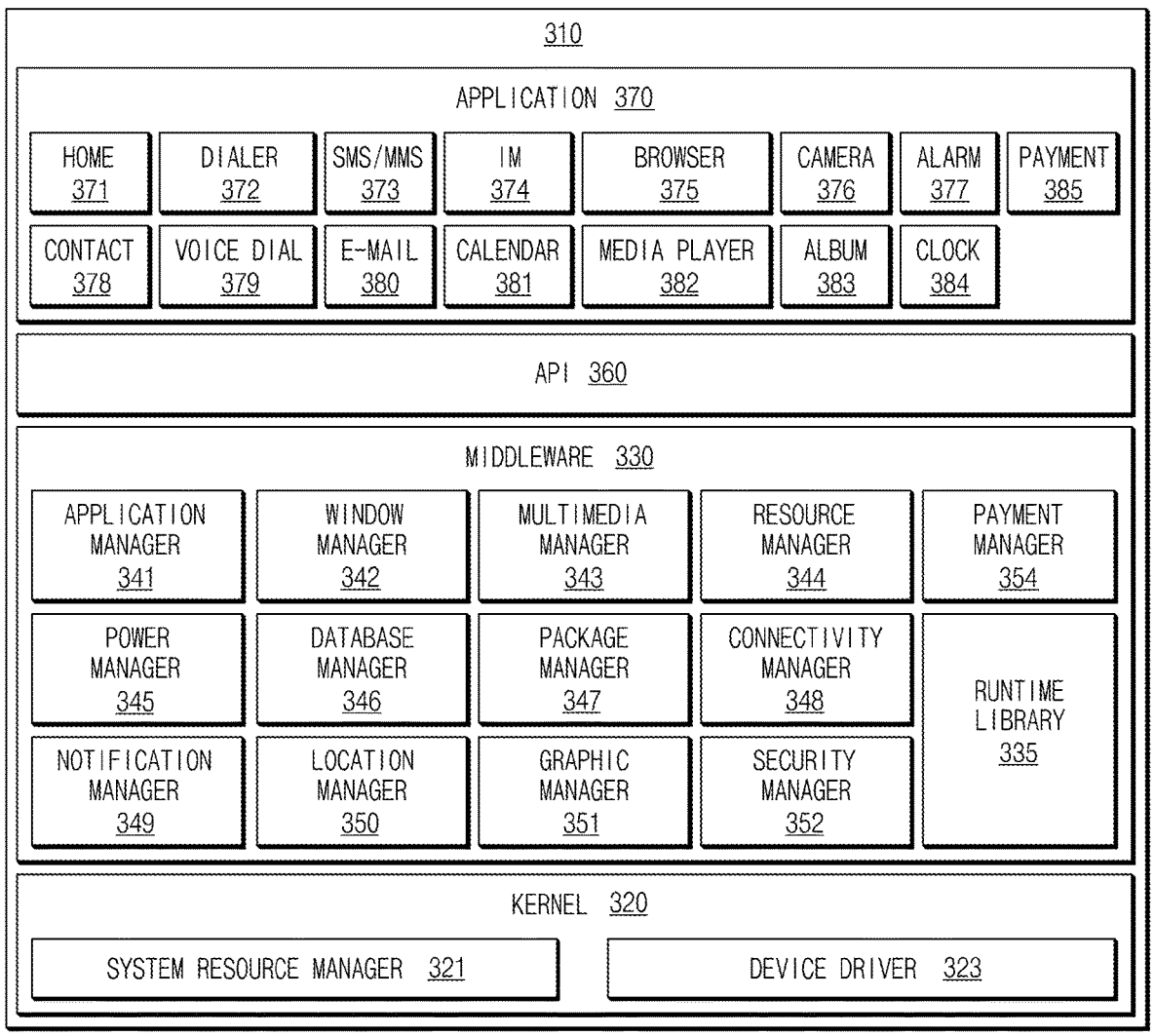
FIG. 3 illustrates a block diagram of a program module according to various embodiments of the present disclosure.

FIG. 3 illustrates a block diagram of a program module according to various embodiments of the present disclosure.

According to an embodiment of the present disclosure, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian®, Tizen™, or Samsung Bada OS™.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102 or 104, the server 106, and the like).

The kernel 320 (e.g., the kernel 141) may include, for example, a system resource manager 321 or a device driver 323. The system resource manager 321 may perform control, allocation, or retrieval of system resources. According to an embodiment of the present disclosure, the system resource manager 321 may include a process managing unit, a memory managing unit, or a file system managing unit. The device driver 323 may include, for example, a display driver, a camera driver, a Bluetooth (BT) driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth (BT). The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment of the present disclosure, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described elements. The middleware 330 may provide a module specialized to each OS kind to provide differentiated functions. Additionally, the middleware 330 may dynamically remove a part of the preexisting elements or may add new elements thereto.

The API 360 (e.g., the API 145) may be, for example, a set of programming functions and may be provided with a configuration that is variable depending on an OS. For example, in the case where an OS is Android™ or the iOS™, it may be permissible to provide one API set per platform. In the case where the OS is Tizen™, it may be permissible to provide two or more API sets per platform.

The application 370 (e.g., the application program 147) may include, for example, one or more applications capable of providing functions for a home 371, a dialer 372, a short message service (SMS)/multimedia messaging service (MMS) 373, an instant message (IM) 374, a browser 375, a camera 376, an alarm 377, a contact 378, a voice dial 379, an e-mail 380, a calendar 381, a media player 382, an album 383, a timepiece or clock 384, and a payment 385 or for offering health care (e.g., measuring an exercise quantity, blood sugar, or the like) or environment information (e.g., information of barometric pressure, humidity, temperature, or the like).

According to an embodiment of the present disclosure, the application 370 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specified information to the external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the information exchanging application may receive, for example, notification information from the external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 102 or 104) which communicates with the electronic device, an application running in the external electronic device, or a service (e.g., a call service, a message service, or the like) provided from the external electronic device.

According to an embodiment of the present disclosure, the application 370 may include an application (e.g., a health care application of a mobile medical device) that is assigned in accordance with an attribute of an external electronic device (e.g., the electronic device 102 or 104). According to an embodiment of the present disclosure, the application 370 may include an application that is received from the external electronic device (e.g., the server 106 or the electronic device 102 or 104). According to an embodiment of the present disclosure, the application 370 may include a preloaded application or a third-party application that is downloadable from a server. The names of elements of the program module 310 according to the embodiment may be modifiable depending on kinds of operating systems (OS's).

According to various embodiments of the present disclosure, at least a portion of the program module 310 may be implemented by software, firmware, hardware, or a combination of two or more thereof. At least a portion of the program module 310 may be implemented (e.g., executed), for example, by at least one processor (e.g., the processor 210 shown in FIG. 2). At least a portion of the program module 310 may include, for example, modules, programs, routines, sets of instructions, processes, or the like for performing one or more functions.

Figure 4:
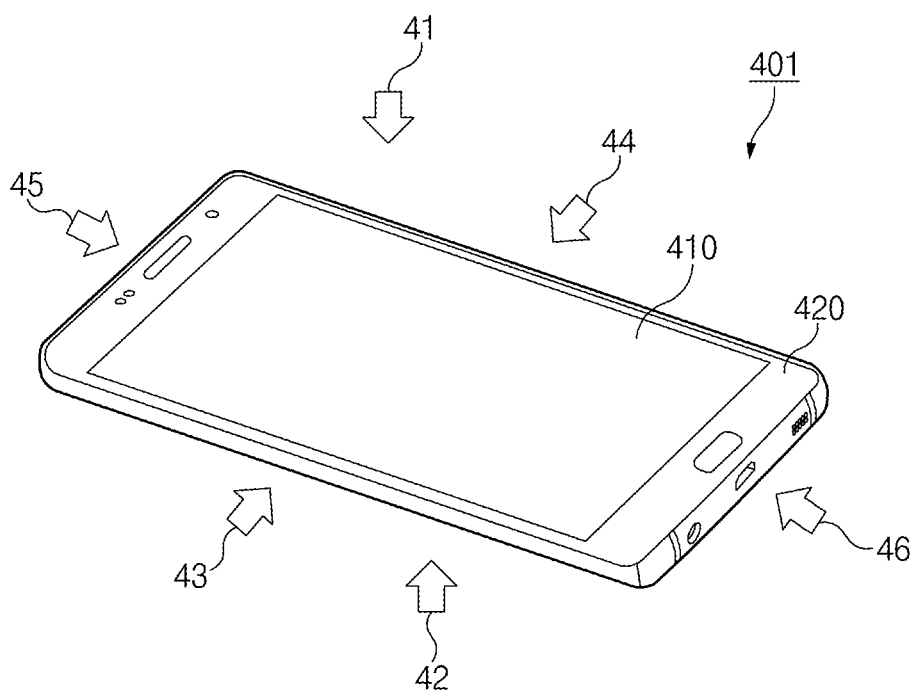
FIG. 4 illustrates an outer appearance of an electronic device according to an embodiment of the present disclosure.

FIG. 4 illustrates an outer appearance of an electronic device, according to an embodiment of the present disclosure.

Referring to FIG. 4, an electronic device 401 may include a display 410 and a housing 420 that form an outer appearance of the electronic device 401. Various circuits or various modules, such as a processor, a memory, and the like, may be positioned inside the electronic device 401 (i.e. inside the housing 420).

According to various embodiments of the present disclosure, the display 410 may be disposed on a front surface of the electronic device 401. For example, the display 410 may be disposed at an inner part between a front surface (first surface) facing in an upper direction (first direction) 41 and a rear surface (second surface) facing in a lower direction (second direction) 42, and may be exposed to the outside through the front surface.

For example, the display 410 may output content (e.g., a text, an image, a video, an icon, a widget, a symbol, or the like), or may receive a touch (including a touch, hovering, and a force touch) input from a user. To this end, the display 410 may include, for example, a cover glass, a display panel, a touch panel, a fingerprint sensor and/or a pressure sensor. The cover glass, the display panel, the touch panel, the fingerprint sensor and/or the pressure sensor may have areas corresponding to each other (e.g., the substantially same area) and may be disposed while being stacked on each other (see FIG. 5).

According to various embodiments of the present disclosure, the display 410 may be disposed on the front surface of the electronic device 401 and may be expanded to at least one of side surfaces from the front surface. For example, the display 410 may be expanded in a left-side direction 43 and/or a right-side direction 44. As the display 410 is expanded in the left-side direction 43 and/or the right-side direction 44, the display 410 may be exposed to the outside through left and right side surfaces as well as the front surface.

According to various embodiments of the present disclosure, the housing 420 may form at least a portion of the outer appearance of the electronic device 401. For example, the housing 420 may include a front surface facing in the upper direction (first direction), a rear surface (second surface) opposite from the front surface, and side surfaces which surround at least a portion of a space between the front surface (first surface) and the rear surface (second surface). The side surfaces may include a left-side surface facing in the left-side direction 43, a right-side surface facing in the right-side direction 44, an upper-side surface facing an upper-side direction 45, and a bottom-side surface facing in a bottom-side direction 46.

The housing 420 may be formed as a plastic injection molded product, a conductive material (e.g., metal), or the combination thereof to protect various internal elements of the electronic device 401 from external impact or external dust. According to an embodiment of the present disclosure, the housing 420 may be used to refer to outer surfaces of the elements. For example, the front surface of the housing 420 may correspond to the cover glass, the side surface of the housing 420 may correspond to a side-surface member of a rear case (or a rear plate), and the rear surface of the housing 420 may correspond to a back cover of a battery.

Figure 5:
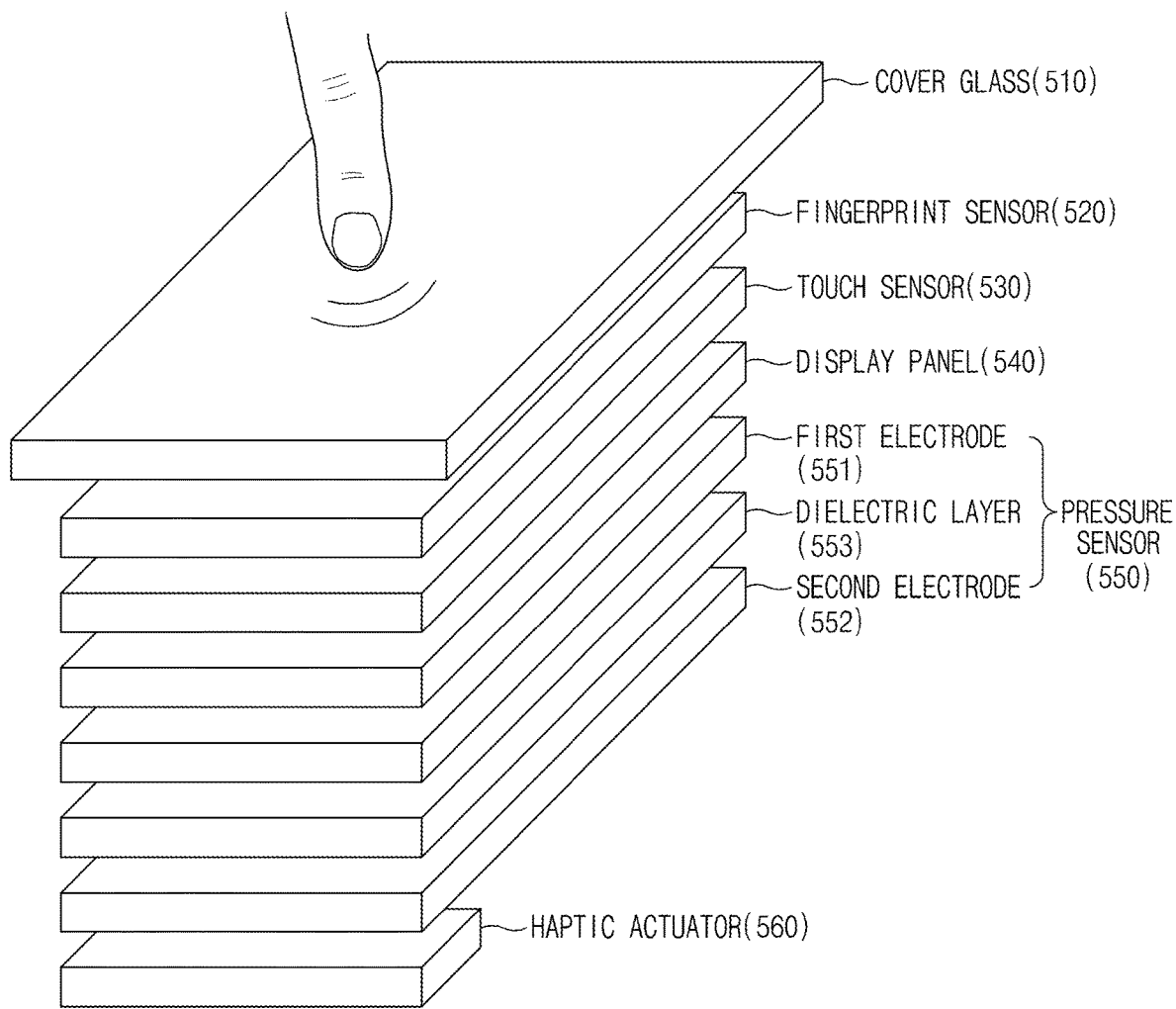
FIG. 5 illustrates a stacked structure of a display according to an embodiment of the present disclosure.

FIG. 5 illustrates a stacked structure of the display, according to an embodiment of the present disclosure.

According to an embodiment of the present disclosure, the stacked structure of the display is illustrated in FIG. 5. For example, the stacked structure is applicable to the display 410 illustrated in FIG. 4.

According to an embodiment of the present disclosure, in the stacked structure of the display, a cover glass 510 may be disposed in an internal space between the front surface (first surface) of the disposed electronic device and the rear surface (second surface; not illustrated) of the housing. The cover glass 510 may be exposed through the front surface (first surface) of the electronic device and may transmit light emitted from a display panel 540. As a user makes contact with a top of the cover glass 510 with a part (e.g., a finger) of a body, a "touch" (including contact using an electronic pen) may be made. The cover glass 510 is formed of, for example, reinforced glass, reinforced plastic, a flexible polymer material, or the like, thereby protecting the display and the electronic device having the display mounted thereon from external impact. According to various embodiments of the present disclosure, the cover glass 510 may be referred to as a glass window or a cover window.

For example, a fingerprint sensor 520 may be disposed in the internal space between the front surface (first surface) of the electronic device, in which the cover glass 510 is disposed, and the rear surface (second surface; not illustrated) of the housing of the electronic device. For example, the fingerprint sensor 520 may be interposed between the cover glass 510 and a touch sensor 530. The fingerprint sensor 520 may detect a fingerprint of a user's finger on at least a portion of the surface of the display (i.e. the surface of the cover glass).

For example, the touch sensor 530 may be disposed in the internal space between the front surface (first surface) of the electronic device, in which the cover glass 510 is disposed, and the rear surface (second surface; not illustrated) of the housing of the electronic device. In the touch sensor 530, a specified physical quantity (e.g., a voltage, light intensity, a resistance, the quantity of an electrical charge, a capacitance, or the like) may be changed by the touch from a user. For example, the touch sensor 530 may include a capacitive touch panel, a pressure-sensitive touch panel, an infrared (IR) touch panel, a resistive touch panel, or a piezo-touch panel. According to various embodiments of the present disclosure, the touch sensor 530 may be referred to as various names, such as a touch panel and the like, based on the implementation types of the touch sensor 530.

According to various embodiments of the present disclosure, the display panel 540 may output content (e.g., a text, an image, a video, an icon, a widget, a symbol, or the like). For example, the display panel 540 may include a liquid crystal display (LCD) panel, a light emitting diode (LED) display panel, an organic light emitting diode (OLED) display panel, a micro-electromechanical system (MEMS) display panel, or an electronic paper display panel.

According to various embodiments of the present disclosure, the display panel 540 may be implemented integrally with the touch sensor (or the touch panel) 530. In this case, the display panel 540 may be referred to as a touch screen panel (TSP) or a touchscreen display panel.

For example, a pressure sensor 550 may be disposed in the internal space between the front surface (first surface) of the electronic device, in which the cover glass 510 is disposed, and the rear surface (second surface; not illustrated) of the housing of the electronic device. The pressure sensor 550 may sense pressure (or force) of an external object (e.g., user's finger) against the cover glass 510. According to an embodiment of the present disclosure, the pressure sensor 550 may include a first electrode 551, a second electrode 552, and/or a dielectric layer 553. For example, the pressure sensor 550 may sense the pressure of a touch based on the capacitance between the first electrode 551 and the second electrode 552, which is changed by the touch.

According to an embodiment of the present disclosure, the first electrode 551 and/or the second electrode 552 may be transparently or opaquely implemented. For example, when the first electrode 551 and/or the second electrode 552 is opaquely implemented, the first electrode 551 and/or the second electrode 552 may be implemented with copper (Cu), silver (Ag), magnesium (Mg), titanium (Ti), or opaque graphene. In addition, when the first electrode 551 and/or the second electrode 552 is transparently implemented, the first electrode 551 and/or the second electrode 552 may be implemented with an indium tin oxide (ITO), an indium zinc oxide (IZO), an Ag nanowire, a metal mesh, a transparent polymer conductor, or transparent graphene.

For example, one of the first electrode 551 and the second electrode 552 may be implemented with one metallic plate serving as a ground (GND), and a remaining one of the first electrode 551 and the second electrode 552 may be formed in a pattern, in which a polygonal shape is repeated, using the above-described member (which is called "a self-capacitance type"). Alternatively, one (e.g., a transmitter (Tx)) of the first electrode 551 and the second electrode 552 may be formed in a pattern extending in the first direction, and a remaining one (e.g., a receiver (Rx)) of the first electrode 551 and the second electrode 552 may be formed in a pattern extending in the second direction crossing the first direction at a specific angle (e.g., a right angle) (which is called "a mutual-capacitance type").

The dielectric layer 553 may be implemented with a dielectric material, for example, silicone foam, a silicon membrane, an optical clean adhesive (OCA), a sponge, rubber, or polymer (e.g., polycarbonate (PC), polyethylene terephthalate (PET), or the like.

When a haptic actuator 560 receives a touch (including one or more of a touch, hovering, and a force touch) input from a user, the haptic actuator 560 may provide haptic feedback (e.g., vibration) to the user. To this end, the haptic actuator 560 may include a piezoelectric member and/or a vibration plate.

The above-described stacked structure of the display of FIG. 5 is provided for an illustrative purpose, and may be variously modified. For example, the touch sensor 530 may be directly formed on a rear surface of the cover glass 510 (which is called "a cover glass-integrated touch panel"). The touch sensor 530 may be formed separately from the cover glass 510 and may be inserted between the cover glass 510 and the display panel 540 (which is called "an add-on touch panel"). The touch sensor 530 may be directly formed on the display panel 540 (which is called "an on-cell touch panel"). The touch sensor 530 may be included in the display panel 540 (which is called "an in-cell touch panel"). According to various embodiments of the present disclosure, the first electrode 551 of the pressure sensor 550 may be formed on a printed circuit board (e.g., a flexible printed circuit board (FPCB)) and may be attached to the display panel 540. Alternatively, the first electrode 551 of the pressure sensor 550 may be directly formed on a rear surface of the display panel 540. In addition, when the fingerprint sensor 520 is opaquely implemented, the fingerprint sensor 520 may be disposed on the rear surface of the display panel 540.

Figure 6A:
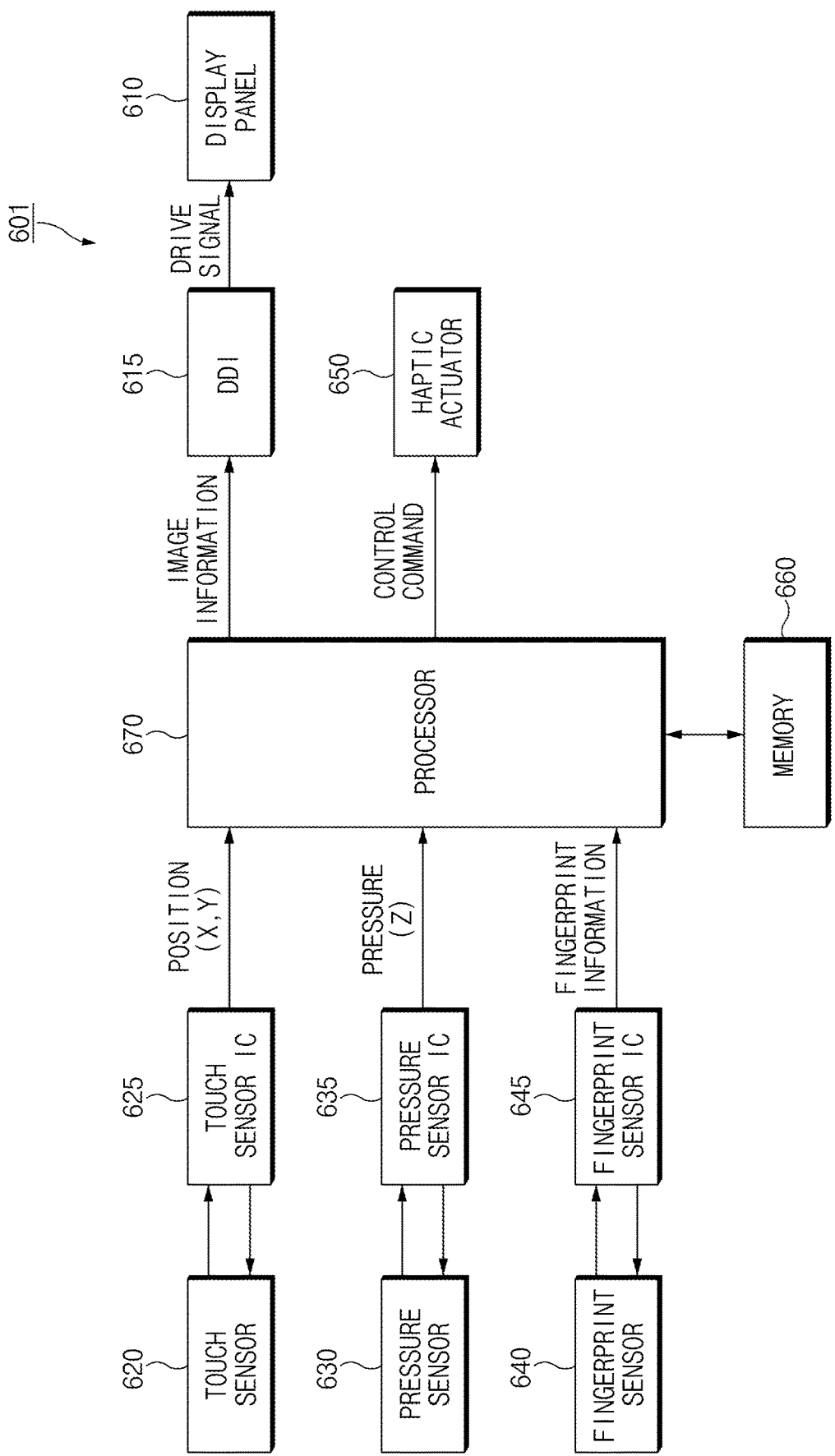
FIG. 6A illustrates a block diagram of an electronic device according to an embodiment of the present disclosure.

FIG. 6A illustrates a block diagram of an electronic device according to an embodiment of the present disclosure.

Referring to FIG. 6A, an electronic device may include a display panel 610, a display driving integrated circuit (DDI) 615, a touch sensor 620, a touch sensor IC 625, a pressure sensor 630, a pressure sensor IC 635, a fingerprint sensor 640, a fingerprint sensor IC 645, a haptic actuator 650, a memory 660, and a processor 670 (e.g., at least one processor). In the following description, the description of the configurations described with reference to FIGS. 1 to 5 may be omitted.

According to various embodiments of the present disclosure, the display panel 610 may receive an image drive signal from the DDI 615. The display panel 610 may display various contents (e.g., a text, a video, an icon, a symbol, and the like) based on the image drive signal. In this disclosure, the display panel 610 may be coupled to the touch sensor 620, the pressure sensor 630 and/or the fingerprint sensor 640 while overlapping the touch sensor 620, the pressure sensor 630 and/or the fingerprint sensor 640 (e.g., as illustrated in FIG. 5). For example, when the display panel 610 is coupled to the touch sensor 620, the coupling structure may be referred to as "a touchscreen display".

According to various embodiments of the present disclosure, the DDI 615 may supply the image drive signal, which corresponds to image information received from the processor (host) 670, to the display panel 610 at a specified frame rate. Although not illustrated in drawings, according to various embodiments of the present disclosure, the DDI 615 may include a graphic random access memory (RAM), an interface module, an image processing unit, a multiplexer, a display timing controller (T-con), a source driver, a gate driver, and/or an oscillator.

According to various embodiments of the present disclosure, in the touch sensor 620, a specified physical quantity (e.g., a voltage, light intensity, a resistance, the quantity of an electrical charge, a capacitance, or the like) may be changed by the touch from a user. According to an embodiment of the present disclosure, the touch sensor 620 may be provided while overlapping with the display panel 610.

According to various embodiments of the present disclosure, the touch sensor IC 625 may sense the change of the physical quantity in the touch sensor 620 and may calculate a position (X, Y), in which the touch is made, based on the change of the physical quantity (e.g., a voltage, a resistance, a capacitance, or the like). The calculated position (coordinates) may be provided to the processor 670.

For example, when a part (e.g., a finger) of a user's body, a stylus (a kind of an electronic pen), or the like makes contact with glass (not illustrated) of the display, a coupling voltage formed by a transmitter (Tx) and a receiver (Rx) included in the touch sensor 620 may be changed. For example, the change of the coupling voltage may be sensed by the touch sensor IC 625, and the touch sensor IC 625 may transfer the coordinates of the position, in which the touch is made, to the processor 670. The processor 670 may acquire data on the coordinates of the position as an event relating to a user input.

According to various embodiments of the present disclosure, the touch sensor IC 625 may be referred to as a touch IC, a touch screen IC, a touch controller, or a touch screen controller IC. According to various embodiments of the present disclosure, in the electronic device without the touch sensor IC 625, the processor 670 may operate as the touch sensor IC 625. According to various embodiments of the present disclosure, the touch sensor IC 625 and the processor 670 may be implemented in the form of one component (e.g., one-chip).

According to various embodiments of the present disclosure, the pressure sensor 630 may sense pressure (or force). For example, the pressure sensor 630 may sense the pressure applied to the touchscreen display by a user's finger. According to an embodiment of the present disclosure, in the pressure sensor 630, the physical quantity (e.g., capacitance) between a transmitter (Tx) (e.g., the first electrode 551 of FIG. 5) and a receiver (Rx) (e.g., the second electrode 552 of FIG. 5) may be changed by the touch.

According to various embodiments of the present disclosure, the pressure sensor IC 635 may sense the change of the physical quantity (e.g., a capacitance or the like) in the pressure sensor 630, and may calculate the pressure Z applied by the touch input from the user based on the change of the physical quantity. The value of the pressure may be provided to the processor 670 together with the position (X, Y) in which the touch is made.

According to various embodiments of the present disclosure, the pressure sensor IC 635 may be referred to as a force touch controller, a force sensor IC, or a pressure panel IC. In addition, according to various embodiments of the present disclosure, the pressure sensor IC 635 and the touch sensor IC 625 may be implemented in the form of one component (e.g., one-chip).

For example, the fingerprint sensor 640 has an area (e.g., the substantially same area) corresponding to the display panel 610, or an area corresponding to at least a portion of the display panel 610. The fingerprint sensor 640 may detect the fingerprint of the user's finger. For example, the fingerprint sensor 640 may capture an image of the fingerprint of the user's finger. The fingerprint sensor 640 may be classified into an optical fingerprint sensor, an ultrasonic fingerprint sensor, and a capacitive fingerprint sensor according to a physical quantity used to capture the image of the fingerprint. Alternatively, the fingerprint sensor 640 may include an area fingerprint sensor to recognize a fingerprint in the unit of a plane.

According to various embodiments of the present disclosure, the fingerprint sensor IC 645 may drive the fingerprint sensor 640, and may scan at least a portion of the area of the fingerprint sensor 640. The fingerprint sensor IC 645 may capture the image of the fingerprint through the scanning. For example, the fingerprint sensor IC 645 may extract a unique feature of the fingerprint from the image of the fingerprint and may provide the extracted feature, which serves as fingerprint information, to the processor 670. For example, the extracted features, that is, fingerprint minutiae may include various fingerprint minutiae, such as a ridge ending, a crossover, a bifurcation, a pore, and the like, included in the fingerprint.

According to various embodiments of the present disclosure, the haptic actuator 650 may provide haptic feedback (e.g., vibration) to a user according to a control instruction of the processor 670. For example, the haptic actuator 650 may provide the haptic feedback to the user, when a touch input (including a touch, hovering, and a force touch) is received from the user.

According to various embodiments of the present disclosure, the memory 660 may store an instruction or data associated with the operation of a component included in an electronic device 601. For example, the memory 660 may store instructions that, when executed, cause the processor 670 to perform various operations (see FIGS. 7A and 7B) disclosed in this disclosure.

According to an embodiment of the present disclosure, the memory 660 may store data (e.g., a fingerprint template) on at least one registered fingerprint (an enrolled fingerprint or a reference fingerprint) which is enrolled in advance by an authorized user.

For example, the processor 670 is electrically coupled to elements 610 to 660 which are included in the electronic device 601. Accordingly, the processor 670 may perform operations relating to the control and/or the communication of the elements included in the electronic device 601 or may perform data processing for the elements included in the electronic device 601.

According to an embodiment of the present disclosure, the processor 670 may sense the pressure of the finger against the touchscreen display using the pressure sensor 630. The processor 670 may activate the fingerprint sensor 640 when the sensed pressure is equal to or greater than a designated value. In other words, when the touch (i.e. force touch) is made with the pressure having the designated value or more, the processor 670 may trigger the fingerprint sensor 640 to activate the fingerprint sensor 640.

According to various embodiments of the present disclosure, the processor 670 may sense the pressure while the display panel 610 is turned on or off. The processor 670 may activate the fingerprint sensor 640 based on the pressure.

For example, the processor 670 may activate the fingerprint sensor 640 when sensing the pressure having the designated value or more, while the display panel 610 is turned off. For example, the display panel 610 may be turned off when the electronic device 601 operates in an idle mode or a sleep mode.

Alternatively, the processor 670 may activate the fingerprint sensor 640 when sensing the pressure having the designated value or more, while the display panel 610 is turned on. For example, the display panel 610 may output a locked screen, a home screen, or an application execution screen, while the display panel 610 is turned on.

According to an embodiment of the present disclosure, the processor 670 may detect the fingerprint of the finger using the activated fingerprint sensor 640. For example, the processor 670 may scan a specified area around a position, to which the touch pressure is applied, on the display using the fingerprint sensor 640. Thereafter, the processor 670 may detect the fingerprint within the specified area.

According to an embodiment of the present disclosure, the processor 670 may compare the detected fingerprint with a registered fingerprint (e.g., fingerprint template) stored in the memory 660. The processor 670 may compare the detected fingerprint using the fingerprint sensor 640 with the registered fingerprint (e.g., fingerprint template) stored in the memory 660, and may determine the fingerprint of the user's finger as being verified when the detected fingerprint is matched with the registered fingerprint. According to various embodiments of the present disclosure, the processor 670 may further perform a specified image pre-processing operation such that the comparison operation is performed with reliability.

According to an embodiment of the present disclosure, the processor 670 may perform a first function when the fingerprint detected using the fingerprint sensor 640 is matched with the registered fingerprint. When the detected fingerprint is not matched with the registered fingerprint, the processor 670 may perform a second function different from the first function.

For example, when the fingerprint is detected while the display panel 610 is turned off, and when the detected fingerprint is matched with the registered fingerprint, the processor 670 may switch the state the display panel 610 to an ON state (one example of the first function). In this case, for example, the processor 670 may output an unlocked home screen, an application screen under execution, or a screen including specified information to the display panel 610.

Alternatively, when the fingerprint is detected while the display panel 610 is turned off, and when the detected fingerprint is not matched with the registered fingerprint, the processor 670 may maintain the display panel 610 in an OFF state (one example of the second function). In addition, when the detected fingerprint is not matched with the registered fingerprint, the processor 670 may temporarily output a warning that the detected fingerprint is not matched with the registered fingerprint, and may maintain the display panel 610 in the OFF state (see FIG. 9).

In addition, when the fingerprint is detected while a specific locked screen is output to the display panel 610 (i.e. while the display panel 610 is turned on), and when the detected fingerprint is matched with the registered fingerprint, the processor 670 may output the unlocked screen to the display panel 610 (one example of the first function). For example, the unlocked screen may include the home screen or the application screen under execution.

Alternatively, when the fingerprint is detected while the locked screen is output to the display panel 610 (i.e. while the display panel 610 is turned on), and when the detected fingerprint is not matched with the registered fingerprint, the processor 670 may maintain the locked screen in a present state (one example of a second function). In addition, when the detected fingerprint is not matched with the registered fingerprint, the processor 670 may temporarily output a warning that the detected fingerprint is not matched with the registered fingerprint, and may maintain the locked screen in a present state (see FIG. 8).

Alternatively, a screen including at least one object associated with an application may be output to the display panel 610 (i.e. while the display panel 610 is turned on). The application may include at least a payment application, a financial application, or an image viewer application.

For example, a touch having a designated pressure value or more may be made on the touchscreen display. In this case, a position to which the touch having the designated pressure value or more is applied may correspond to a position to which the object associated with the application is output (displayed). In other words, a user may select the object associated with the application by the touch having the designated pressure value or more. When the touch having the designated pressure value or more is applied to the object, the processor 670 may activate the fingerprint sensor 640 and may detect the fingerprint using the activated fingerprint sensor 640.

When the detected fingerprint is matched with the registered fingerprint, the processor 670 may withdraw a security policy set by the selected application (one example of a first function). According to various embodiments of the present disclosure, the processor 670 may output the execution screen of an application, in which the security policy is withdrawn, to the display panel 610.

Alternatively, when the detected fingerprint is not matched with the registered fingerprint, the processor 670 may maintain the security policy, which is set, by the application (one example of the second function). For example, when the security policy is maintained, the execution screen of an application, in which the security policy is maintained, may be output to the display panel 610, or the application may not be executed (see FIGS. 10 to 14).

According to another embodiment of the present disclosure, the processor 670 may sense the pressure of a user's finger against the touchscreen display using the pressure sensor 630. When the processor 670 senses the pressure of the user's finger, the processor 670 may activate the fingerprint sensor 640 and may detect the fingerprint of the user's finger using the fingerprint sensor 640. Thereafter, the processor 670 determines whether the detected fingerprint is matched with the registered fingerprint stored in the memory 660. When the detected fingerprint is matched with the registered fingerprint, a preselected function (the first function) may be performed without further requiring authentication. For example, when pressure is applied to an object (e.g., an icon or the like) of an application output to the touchscreen display by the user's finger, the processor 670 may perform the function of the application without further requiring authentication.

According to various embodiments of the present disclosure, the processor 670 may sense the pressure of the user's finger against the touchscreen display using the pressure sensor 630, while the touchscreen display (or the display panel 610 of the touchscreen display) is turned off, or while the touchscreen display is turned on.

According to various embodiments of the present disclosure, the processor 670 may sense the pressure of the user's finger against the touchscreen display regardless of the ON/OFF state of the display panel 610, while the electronic device 601 is in a locked state. While the electronic device 601 is in the locked state, the processor 670 may sense the pressure of the user's finger. When the pressure has the designated value or more, the processor 670 may detect the fingerprint of the user's finger using the fingerprint sensor 640. When the detected fingerprint is matched with the registered fingerprint, the processor 670 may unlock the locked state of the electronic device 601.

As described above, the processor 670 of the electronic device 601 may verify the fingerprint of the user's finger when the pressure of the user's finger against the touchscreen display is equal to or greater than the designated value. The processor 670 may perform the first function or the second function depending on whether the fingerprint of the user's finger is verified. However, the processor 670 may perform various functions in addition to the first function and the second function.

For example, the processor 670 may set three pressure ranges based on a designated pressure value P1 (e.g., $P_{thres}$ in FIG. 6B) for activating the fingerprint sensor 640 and a pressure value P2 greater than the designated pressure value P1. In other words, when the pressure P of the user's finger against the touchscreen display is equal to or greater than the designated pressure value P1, and less than the pressure value P2 (P1≤P<P2), the processor 670 may be configured to perform the first function (e.g., a function of outputting an unlocked home screen) after the processor 670 successfully verifies the fingerprint. Meanwhile, when the pressure P of the user's finger is equal to or greater than the pressure value P2 (P2≤P), the processor 670 may be configured to perform a third function (e.g., a function of outputting the execution screen of a specified application) after the processor 670 successfully verifies the fingerprint. In addition, when the pressure P of the user's finger is equal to or greater than the pressure value P1 (P1≤P), and when the processor 670 fails to verify the fingerprint, the processor 670 may be configured to perform the second function (e.g., a function of outputting a notice of verification failure).

The above-described operations of the processor 670 are provided for the illustrative purpose, and this disclosure is not limited thereto. In other words, it may be understood by those skilled in the art that operations of a processor described in different portions of this disclosure serve as the operations of the processor 670. In this disclosure, it may be understood by those skilled in the art that at least a portion of operations, which are described as operations of an "electronic device", serves as the operations of the processor 670.

Figure 6B:
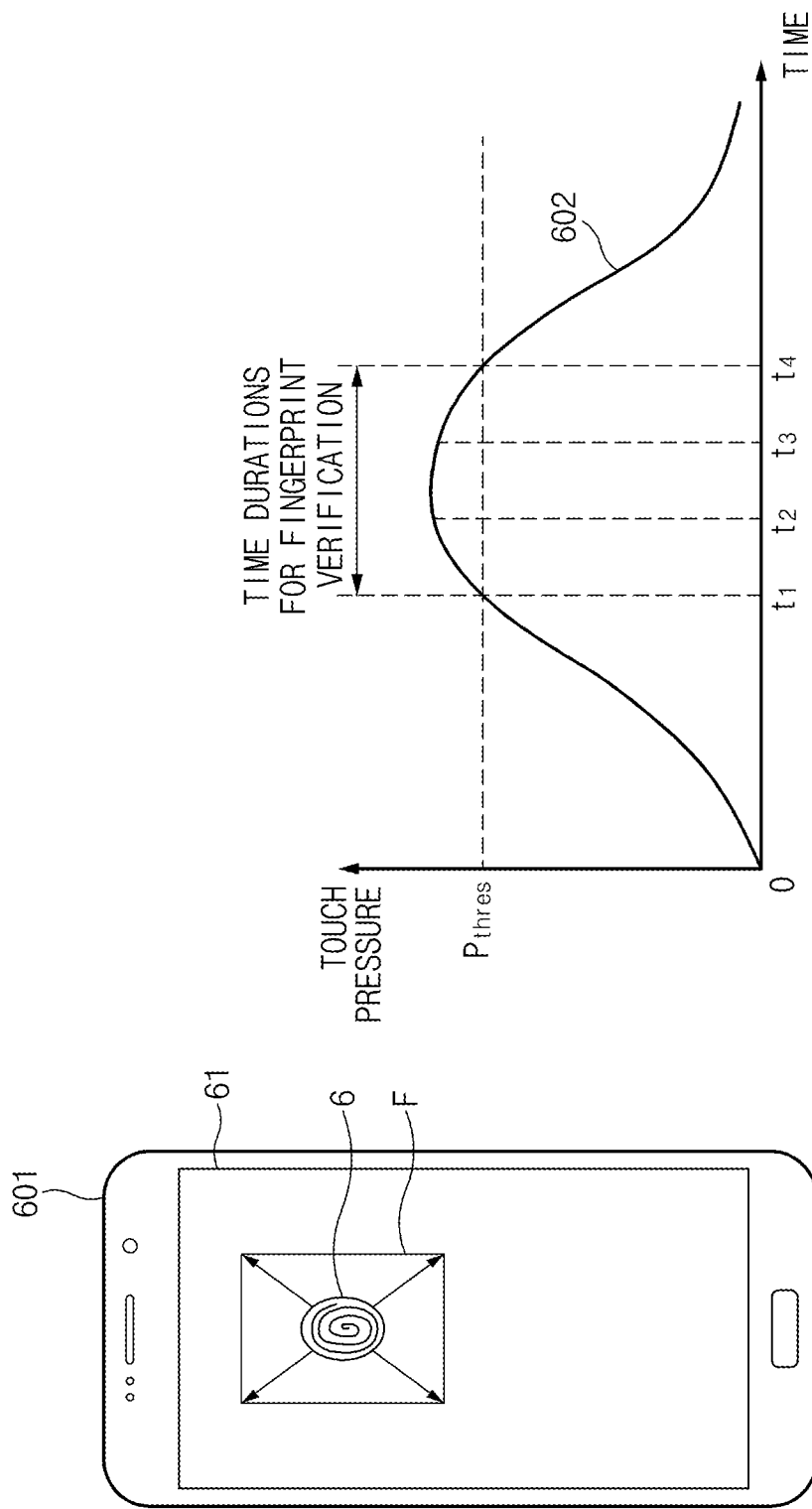
FIG. 6B illustrates a fingerprint verification method according to an embodiment of the present disclosure.

FIG. 6B illustrates a fingerprint verification method according to an embodiment of the present disclosure.

According to an embodiment of the present disclosure, the electronic device 601, which performs the fingerprint verification method, is illustrated in FIG. 6B. For example, the electronic device 601 may sense the pressure of a touch 6, which is applied to a touchscreen display 61 by a user's finger, using a pressure sensor which is disposed while overlapping a rear surface or a surface of a touchscreen display 61 (e.g., as illustrated in FIG. 5). The processor 670 may activate a fingerprint sensor when the sensed pressure is equal to or greater than a designated value, and may detect the fingerprint of the user's finger using the activated fingerprint sensor.

According to an embodiment of the present disclosure, the processor of the electronic device 601 may scan a specified area of a touchscreen display 61, including a position, to which a touch pressure is applied, using the fingerprint sensor. For example, the processor may scan a specified area F including a position, to which a touch pressure is applied (i.e. a position in which the touch 6 is made), using the fingerprint sensor. Thereafter, the processor may detect a fingerprint within the specified area F. In other words, the processor of the electronic device 601 may specify the center of a contact surface with the user's finger when the user's finger makes the touch 6 with the pressure having the designated value or more at any point of the touchscreen display. The processor 670 of the electronic device 601 may scan for the fingerprint within the specified area F designated as the center (the specified area may have the size corresponding to 1.5 times the size of a home button disposed at the electronic device 601). Accordingly, the electronic device 601 needs not to scan the entire area of the touchscreen display 61.

Meanwhile, referring to a curve 602, a graph, which represents a touch input as a function of time, is illustrated. For example, the electronic device 601 may detect the fingerprint of a user's finger for time durations (e.g., fingerprint verification durations t1 to t4) of the designated pressure value $P_{thres}$ or more.

For example, for the time durations of '0' and t1, the user may make contact with the touchscreen display 61 (or may make a touch to the touchscreen display), and may increase a pressure value against the touchscreen display 61.

For example, when the touch pressure reaches the designated pressure value $P_{thres}$ at the time point of t1, the processor of the electronic device 601 may activate the specified area F of the fingerprint sensor around the position to which the touch pressure is applied by the user's finger. Alternatively, the processor 670 of the electronic device 601 may activate the entire area of the fingerprint sensor (e.g., an area corresponding to the entire area of the touchscreen display 61).

For example, the processor of the electronic device 601 may scan the specified area F using the fingerprint sensor for the time duration of t1 and t2. After the processor 670 of the electronic device 601 finishes the scanning of the specified area F, the processor of the electronic device 601 may capture an image of the fingerprint using the fingerprint sensor. In other words, the processor may capture the image of the fingerprint from the fingerprint sensor through the fingerprint sensor IC.

When the image of the fingerprint is captured, the processor may extract fingerprint minutiae of the fingerprint from the image of the fingerprint, may compare the fingerprint with a registered fingerprint based on the extracted features, and may determine whether the fingerprint is matched with the registered fingerprint, for the time durations of t3 and t4.

Figure 7A:
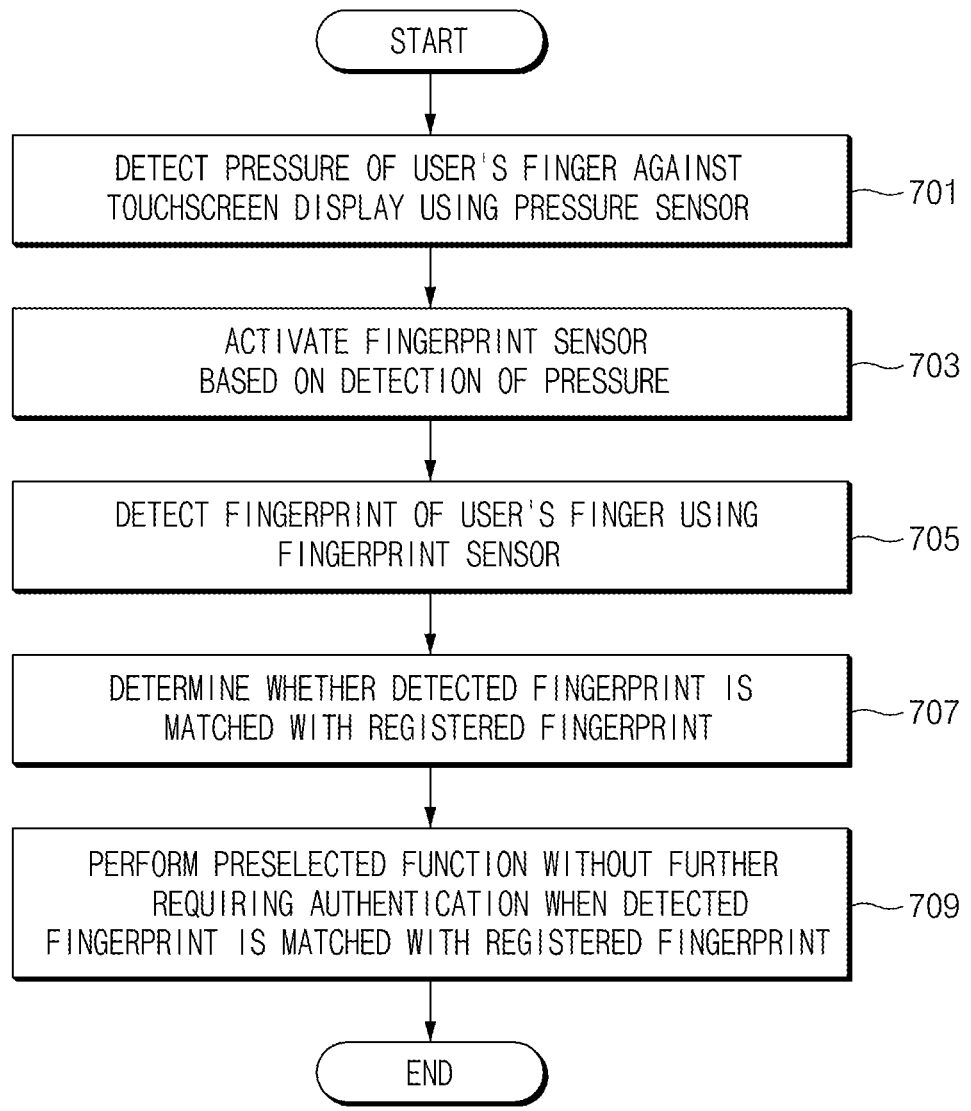
FIG. 7A illustrates a flowchart of a fingerprint verification method according to an embodiment of the present disclosure.

FIG. 7A illustrates a flowchart of the fingerprint verification method according to an embodiment of the present disclosure.

Referring to FIG. 7A, the fingerprint verification method according to an embodiment may include operations 701 to 709. For example, the operations 701 to 709 may be performed by the electronic device 601 of FIGS. 6A and 6B. Each of the operations 701 to 709 may be implemented, for example, by instructions (commands) which may be executed (or carried out) by the processor 670 of the electronic device 601. The instructions may be stored, for example, in computer recording medium or the memory 660 of the electronic device 601 illustrated in FIG. 2. In the following description of the operations 701 to 709, the reference numerals of FIGS. 6A and 6B will be used.

According to various embodiments of the present disclosure, in operation 701, the electronic device 601 (or the processor 670 of the electronic device 601) may sense the pressure of a user's finger against the touchscreen display (including at least one of the display panel 610, the touch sensor 620, the pressure sensor 630, and/or the fingerprint sensor 640; see FIG. 5) using the pressure sensor 630.

According to an embodiment of the present disclosure, the electronic device 601 (the processor 670 of the electronic device 601) may sense the pressure applied by the user's finger not only while the display panel 610 of the touchscreen display is turned on, but also while only a portion of the display panel 610 is turned on (e.g., "always-on" mode) or the entire portion of the display panel 610 is turned off. According to another embodiment of the present disclosure, the processor 670 may sense the pressure applied by the user's finger even while the electronic device 601 is in a locked state.

According to various embodiments of the present disclosure, in operation 703, the electronic device 601 (or the processor 670 of the electronic device 601) may activate the fingerprint sensor 640 upon sensing of the pressure applied by the user's finger. For example, the processor 670 may activate only the specified area (e.g., "F" illustrated in FIG. 6B) around the position, to which the touch pressure is applied, in the entire area of the fingerprint sensor 640.

According to various embodiments of the present disclosure, in operation 705, the electronic device 601 (or the processor 670 of the electronic device 601) may detect the fingerprint of the user's finger using the fingerprint sensor 640. For example, the processor 670 may scan only the specified area (e.g., "F" illustrated in FIG. 6B) around the position, to which the touch pressure is applied, and may detect the fingerprint within the specified area.

According to various embodiments of the present disclosure, in operation 707, the electronic device 601 (the processor 670 of the electronic device 601) may determine whether the detected fingerprint is matched with a registered fingerprint (e.g., at least one registered fingerprint) stored in the memory 660.

According to various embodiments of the present disclosure, in operation 709, the electronic device 601 (or the processor 670 of the electronic device 601) may perform a preselected function without further requiring authentication when the fingerprint detected in the operation 705 is matched with the registered fingerprint stored in the memory 660. For example, when pressure is applied to an object of an application, which is output on the touchscreen display, by the user's finger, the processor 670 may perform a function (preselected function and one example of a first function) of the application without further requiring authentication. In addition, the preselected function may include, for example, a function of unlocking the electronic device 601.

According to various embodiments of the present disclosure, in operation 709, the electronic device 601 (the processor 670 of the electronic device 601) may make the activated fingerprint sensor 640 inactive or turn-off, and may perform the preselected function without further requiring authentication when the detected fingerprint is matched with the registered fingerprint.

Figure 7B:
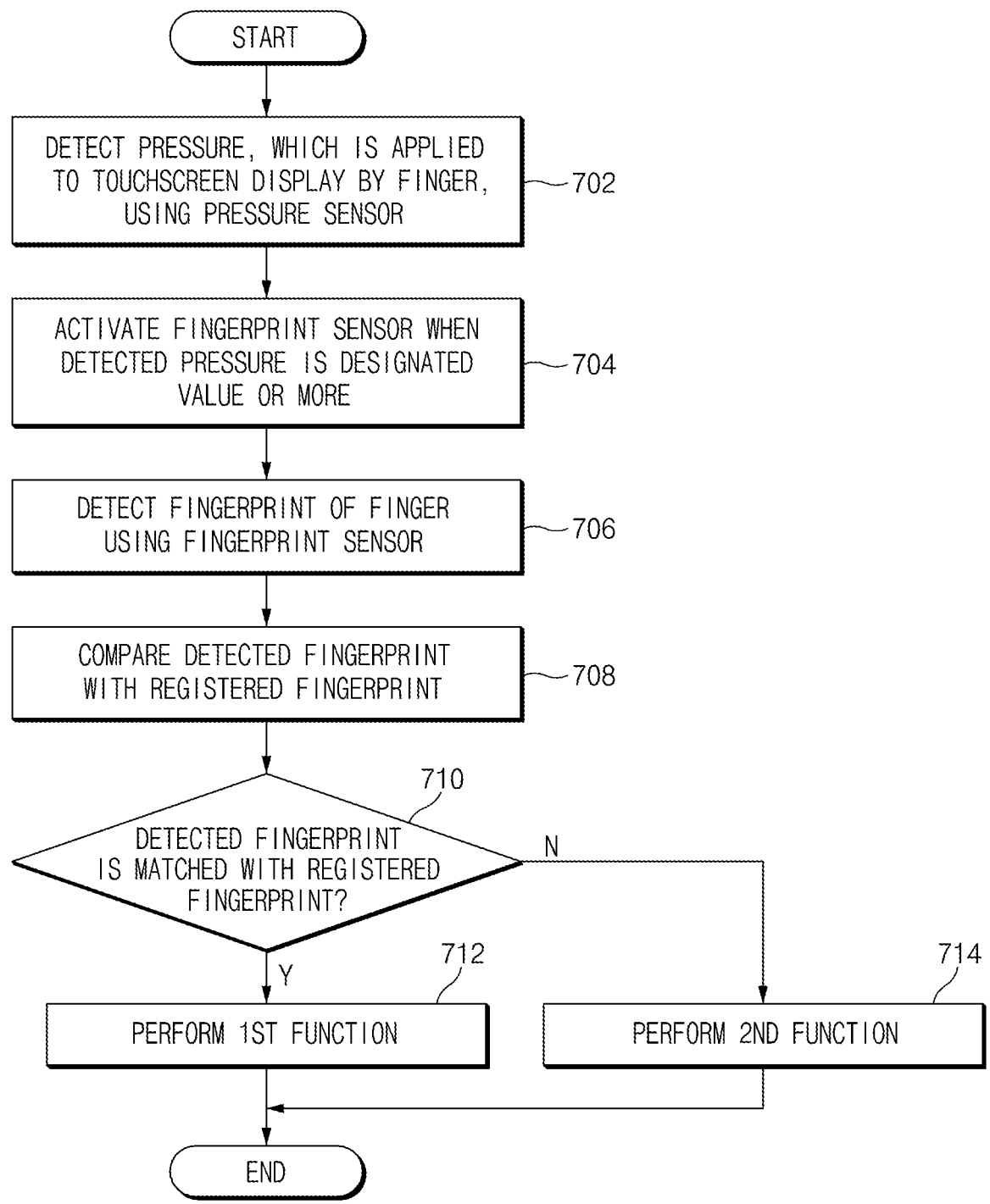
FIG. 7B illustrates a flowchart of a fingerprint verification method according to another embodiment of the present disclosure.

FIG. 7B illustrates a flowchart of the fingerprint verification method according to another embodiment of the present disclosure.

Referring to FIG. 7B, the fingerprint verification method according to an embodiment may include operations 702 to 714. For example, operations 702 to 714 may be performed by the electronic device 601 of FIGS. 6A and 6B. Each of operations 702 to 714 may be implemented, for example, by instructions (commands) which may be executed (or carried out) by the processor 670 of the electronic device 601. The instructions may be stored, for example, in computer recording medium or the memory 660 of the electronic device 601 illustrated in FIG. 2. In the following description of the operations 702 to 714, the reference numerals of FIGS. 6A and 6B will be used.

According to various embodiments of the present disclosure, in operation 702, the electronic device 601 (or the processor 670 of the electronic device 601) may sense the pressure of a user's finger against the touchscreen display (including at least one of the display panel 610, the touch sensor 620, the pressure sensor 630, and the fingerprint sensor 640; see FIG. 5) by using the pressure sensor 630.

According to an embodiment of the present disclosure, the electronic device 601 (the processor 670 of the electronic device 601) may sense the pressure applied by the user's finger not only while the display panel 610 of the touchscreen display is turned on, but also while the display panel 610 of the touchscreen display is turned off. When the display panel 610 is turned on, a locked screen, a home screen, or an application execution screen may be output to the display panel 610. For example, when the home screen is output, the position, to which the pressure is applied, on the touchscreen display may correspond to a position, to which an object associated with a specified application is output, on the touchscreen display.

According to various embodiments of the present disclosure, in operation 704, the electronic device 601 (the processor 670 of the electronic device 601) may activate the fingerprint sensor 640 when the pressure sensed in operation 702 is equal to or greater than a designated value. When a force touch is received from a user, the fingerprint sensor 640 and the fingerprint sensor IC 645 may be triggered to operate.

According to an embodiment of the present disclosure, the electronic device 601 (the processor 670 of the electronic device 601) may activate only the specified area (e.g., F illustrated in FIG. 6B) around the position, to which the touch pressure is applied, in the entire area of the fingerprint sensor 640 (corresponding to the entire area of the touchscreen display).

According to various embodiments of the present disclosure, in operation 706, the electronic device 601 (the processor 670 of the electronic device 601) may detect the fingerprint of the user's finger using the activated fingerprint sensor 640. The detecting of the fingerprint may include scanning a specified area (e.g., F illustrated in FIG. 6B) around a position to which the touch pressure is applied and detecting the fingerprint within the specified area.

According to various embodiments of the present disclosure, in operation 708, the electronic device 601 (the processor 670 of the electronic device 601) may perform an operation of comparing the fingerprint detected in operation 706 with the registered fingerprint. For example, the fingerprint detected in operation 706 may be compared with the registered fingerprint stored in the memory 660 by the processor 670 of the electronic device 601.

According to various embodiments of the present disclosure, in operation 710, the electronic device 601 (the processor 670 of the electronic device 601) may determine whether the fingerprint compared in the operation 708 is matched with the registered fingerprint. When the detected fingerprint is matched with the registered fingerprint according to the determination result in operation 710, the electronic device 601 (the processor 670 of the electronic device 601) may perform a first function, which is preselected, in operation 712.

For example, in the case that the state of the touchscreen display is an OFF state when operation 702 is performed, the first function may include a function of switching the state of the touchscreen display to an ON state. In this case, the first function may further include a function of outputting an unlocked screen to the touchscreen display.

Alternatively, in the case that the state of the touchscreen display is the ON state and the locked screen is output to the touchscreen display when operation 702 is performed, the first function may include a function of outputting the unlocked screen to the touchscreen display.

Alternatively, when operation 702 is performed, the state of the touchscreen display may be the ON state, the home screen may be output to the touchscreen display, and a position, to which the pressure is applied by the user's finger, on the touchscreen display may correspond to a position, to which an object associated with a specified application is output, on the touchscreen display. In this case, the first function may include a function of withdrawing a security policy set by the specified application. The first function may further include a function of outputting a screen, in which the security policy is withdrawn, to the touchscreen display.

When the detected fingerprint is not matched with the registered fingerprint according to the determination result in operation 710, the electronic device 601 (the processor 670 of the electronic device 601) may perform a second function in operation 714. For example, the processor 670 of the electronic device 601 may perform the second function different from the first function.

For example, in the case that the state of the touchscreen display is the OFF state when operation 702 is performed, the second function may include a function of maintaining the touchscreen display in the OFF state.

Alternatively, in the case that the state of the touchscreen display is the ON state and the locked screen is output to the touchscreen display when operation 702 is performed, the second function may include a function of maintaining the locked screen.

Alternatively, when operation 702 is performed, the state of the touchscreen display may be the ON state, the home screen may be output to the touchscreen display, and a position, to which the pressure is applied by the user's finger, on the touchscreen display may correspond to a position, to which the object associated with the specified application is output, on the touchscreen display. In this case, the second function may include a function of maintaining a security policy set by the specified application. According to various embodiments of the present disclosure, the second function may further include a function of outputting a screen, in which the security policy is maintained, to the touchscreen display.

According to an embodiment of this disclosure, when the touch (force touch) having a designated pressure value or more is sensed by the pressure sensor, the electronic device 601 may activate the fingerprint sensor and may verify the fingerprint of the user's finger which makes a touch. Accordingly, various operating processes performed to verify a fingerprint may be reduced according to the related art.

Hereinafter, an electronic device employing a fingerprint verification method according to various embodiments will be described with reference to FIGS. 8 to 15. This disclosure is not limited to the fingerprint verification method described with reference to FIGS. 8 to 15.

Figure 8:
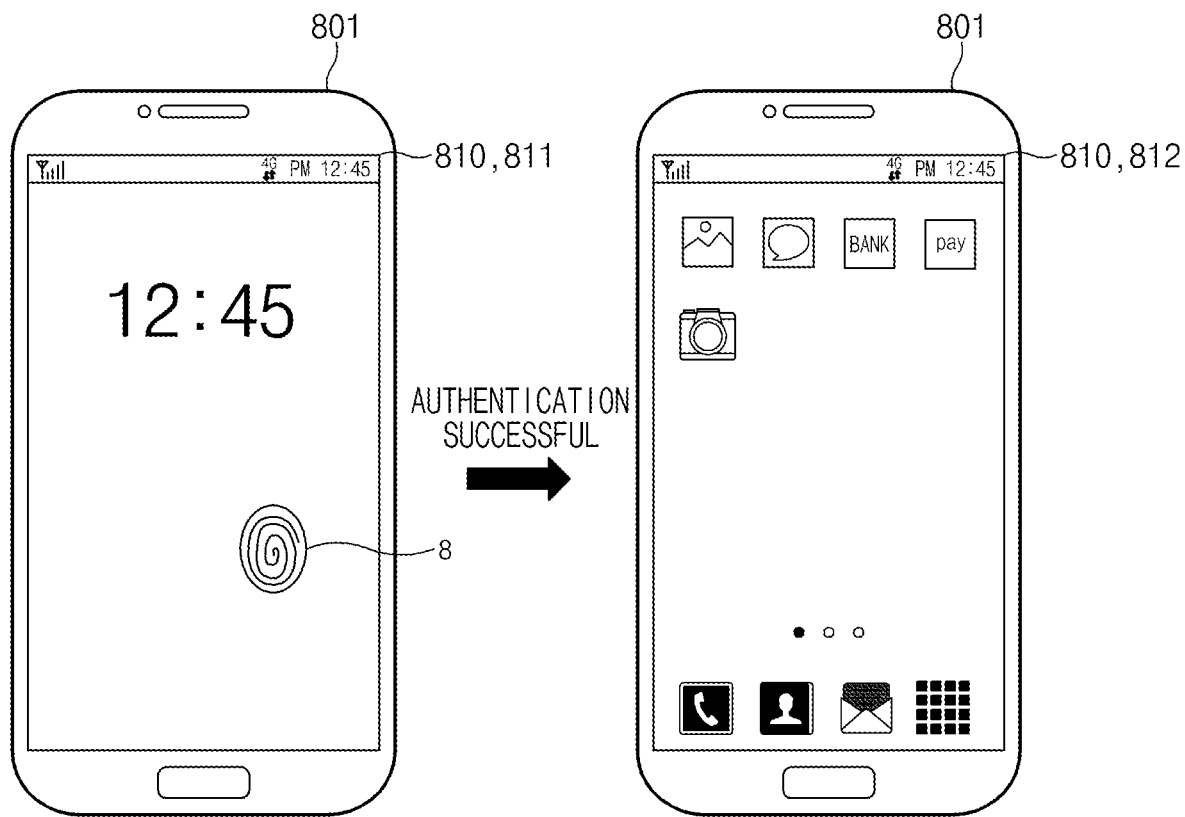
FIG. 8 illustrates a fingerprint verification method applied to a locked screen according to an embodiment of the present disclosure.

FIG. 8 illustrates the fingerprint verification method applied to the locked screen according to an embodiment of the present disclosure.

Referring to FIG. 8, according to an embodiment of the present disclosure, a locked screen 811 may be output to a (touch screen) display 810 of an electronic device 801. In other words, a status bar and a clock may be displayed on the locked screen 811.

For example, the electronic device 801 may receive a touch (force touch) 8 having a designated pressure or more against any area of the display 810. When the force touch 8 is made on the display 810, the electronic device 801 may activate a fingerprint sensor based on the pressure of the force touch 8. The electronic device 801 may detect the fingerprint of the finger, which makes the force touch 8, using the activated fingerprint sensor. The electronic device 801 may compare the detected fingerprint with a registered fingerprint stored in a memory.

For example, when the detected fingerprint is matched with the registered fingerprint (i.e. when the fingerprint is successfully verified), the electronic device 801 may output a home screen 812, which is unlocked, to the display 810 (one example of a first function). According to various embodiments of the present disclosure, when the fingerprint is successfully verified, the electronic device 801 may display a screen resulting from an application under execution instead of the home screen 812.

Alternatively, when the detected fingerprint is not matched with the registered fingerprint (i.e. when the fingerprint fails to be verified), the electronic device 801 may continuously output a locked screen 811 (one example of a second function). According to various embodiments of the present disclosure, when the fingerprint fails to be verified, the electronic device 801 may temporarily output a warning that the detected fingerprint is not matched with the registered fingerprint.

Figure 9:
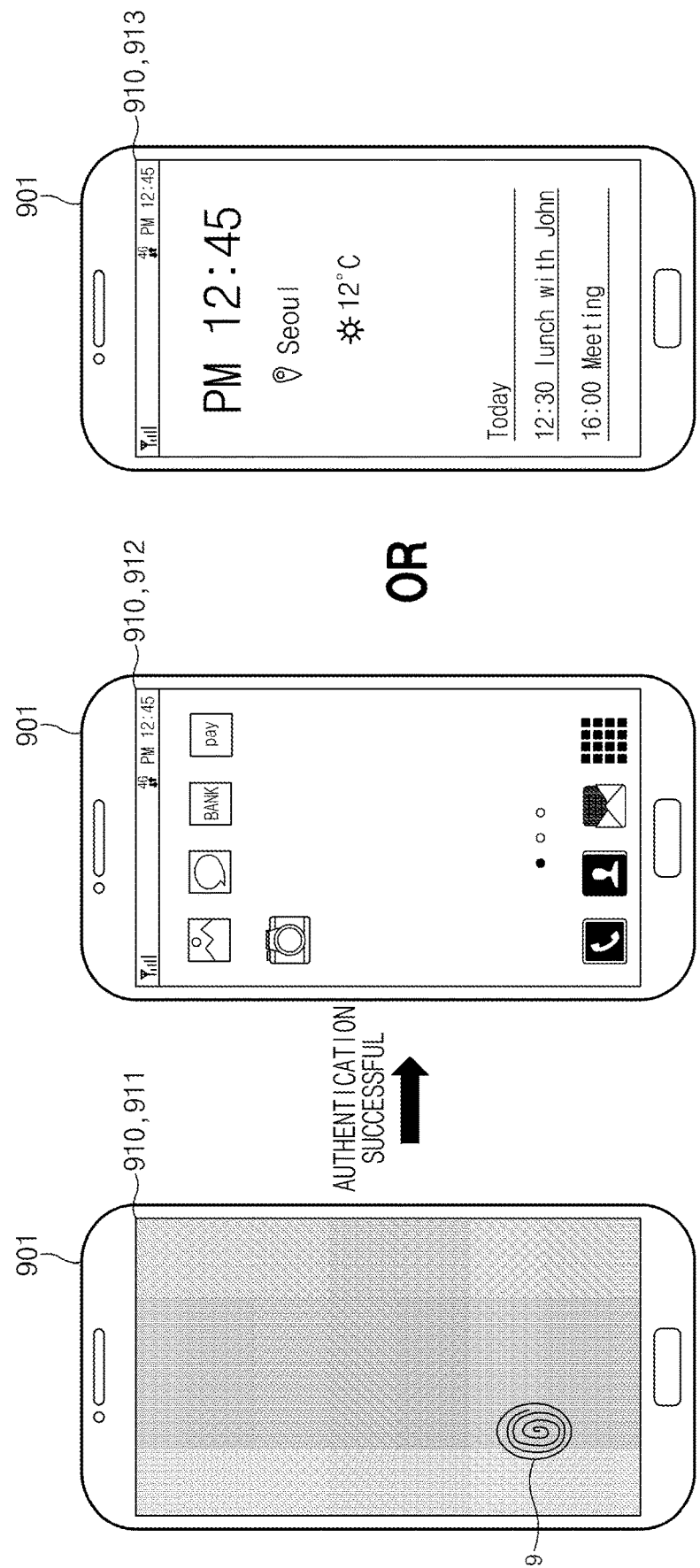
FIG. 9 illustrates a finger verification method applied to a screen in an OFF state according an embodiment of the present disclosure.

FIG. 9 illustrates the finger verification method applied to a screen in an OFF state according an embodiment of the present disclosure.

Referring to FIG. 9, according to an embodiment of the present disclosure, any content may not be displayed on a (touchscreen) display 910 of an electronic device 901 (the screen 911 in an OFF state). In the case of the screen 911 in the OFF state, although a display panel and/or a touch sensor included in the (touchscreen) display 910 may not be supplied with power, a pressure sensor included in the (touchscreen) display 910 may be supplied with power. Accordingly, the pressure sensor may be normally operated even if the screen 911 is in the OFF state.

For example, the electronic device 901 may receive a force touch 9 to any area of the display 910. When the force touch 9 is made on the display 910, the electronic device 901 may activate a fingerprint sensor based on the pressure of the force touch 9. The fingerprint of a finger, which makes the force touch 9, may be detected by the activated fingerprint sensor. The electronic device 901 may compare the detected fingerprint with the registered fingerprint stored in the memory.

For example, when the detected fingerprint is matched with the registered fingerprint (i.e. when the fingerprint is successfully verified), the electronic device 901 switches the state of the display 910 to an ON state, and a home screen 912, which is unlocked, may be output to the display 910 (one example of the first function).

Alternatively, when the fingerprint is successfully verified on the screen 911 which is in the OFF state, the electronic device 901 may switch the state of the display 910 to the ON state, and a screen 913 including specified information may be output to the display 910 (one example of the first function). For example, the screen 913 including information, which is specified in advance, may include information on time, a location, weather, schedule, and the like.

Alternatively, when the detected fingerprint is not matched with the registered fingerprint (i.e. when the fingerprint fails to be verified), the electronic device 901 may continuously output the screen 911 which is in the OFF state (one example of the second function). According to various embodiments of the present disclosure, when the fingerprint fails to be verified, the electronic device 901 may temporarily output a warning that the detected fingerprint is not matched with the registered fingerprint. The warning is not limited to the above example, but may be variously formed. In other words, the electronic device 901 may output a notice that a limited function may be performed, a notice of requiring another security authentication means (e.g., a password and the like), or a notice of recommending the re-input of a fingerprint.

Figure 10:
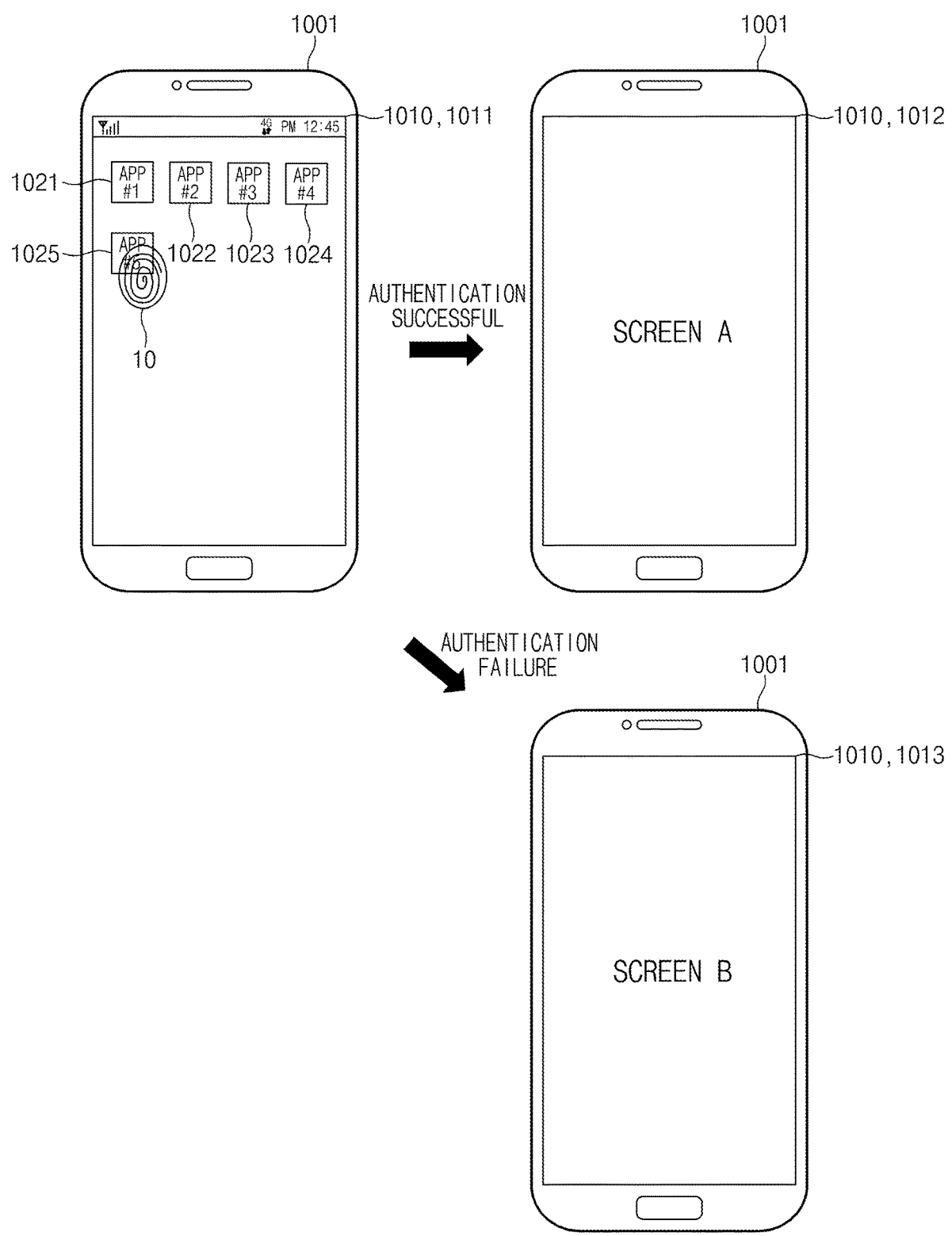
FIG. 10 illustrates a fingerprint verification method applied to an application according to an embodiment of the present disclosure.

FIG. 10 illustrates a fingerprint verification method applied to an application, according to an embodiment of the present disclosure.

Referring to FIG. 10, according to an embodiment of the present disclosure, a home screen 1011 including a plurality of application icons 1021 to 1025 may be output to a (touchscreen) display 1010 of an electronic device 1001. Although FIG. 10 illustrates only icons, various graphic user interface (GUI) objects associated with an application such as a widget may be output on the home screen 1011. According to various embodiments of the present disclosure, the electronic device 1001 may correspond to the electronic device 601 of FIGS. 6A and 6B.

For example, the electronic device 1001 may detect the input of a force touch 10 to a position, to which a fifth application icon 1025 is output, on the (touchscreen) display 1010. For example, when the force touch 10 is made on the display 1010, the electronic device 1001 may activate a fingerprint sensor based on the pressure of the force touch. The electronic device 1001 may detect the fingerprint of the finger, which makes the force touch 10, using the activated fingerprint sensor. The electronic device 1001 may compare the detected fingerprint with the registered fingerprint stored in the memory.

For example, when the detected fingerprint is matched with the registered fingerprint (i.e. when the fingerprint is successfully verified), the electronic device 1001 may withdraw a security policy set by the fifth application, and may output screen "A" 1012 in which the security policy is withdrawn (one example of a first function). In other words, when the fingerprint is successfully verified, the electronic device 1001 may output the screen "A" 1012 to be executed as the security policy set by the fifth application is withdrawn (which may be called a "secret mode").

For example, when the fingerprint fails to be verified, the electronic device 1001 may maintain the security policy set by the fifth application, and may output screen "B" 1013 in which the security policy is maintained (one example of a second function). In other words, when the fingerprint fails to be verified, the electronic device 1001 may output the screen "B" 1013 executed based on the application of the security policy set by the fifth application (which is called "normal mode").

Figure 11:
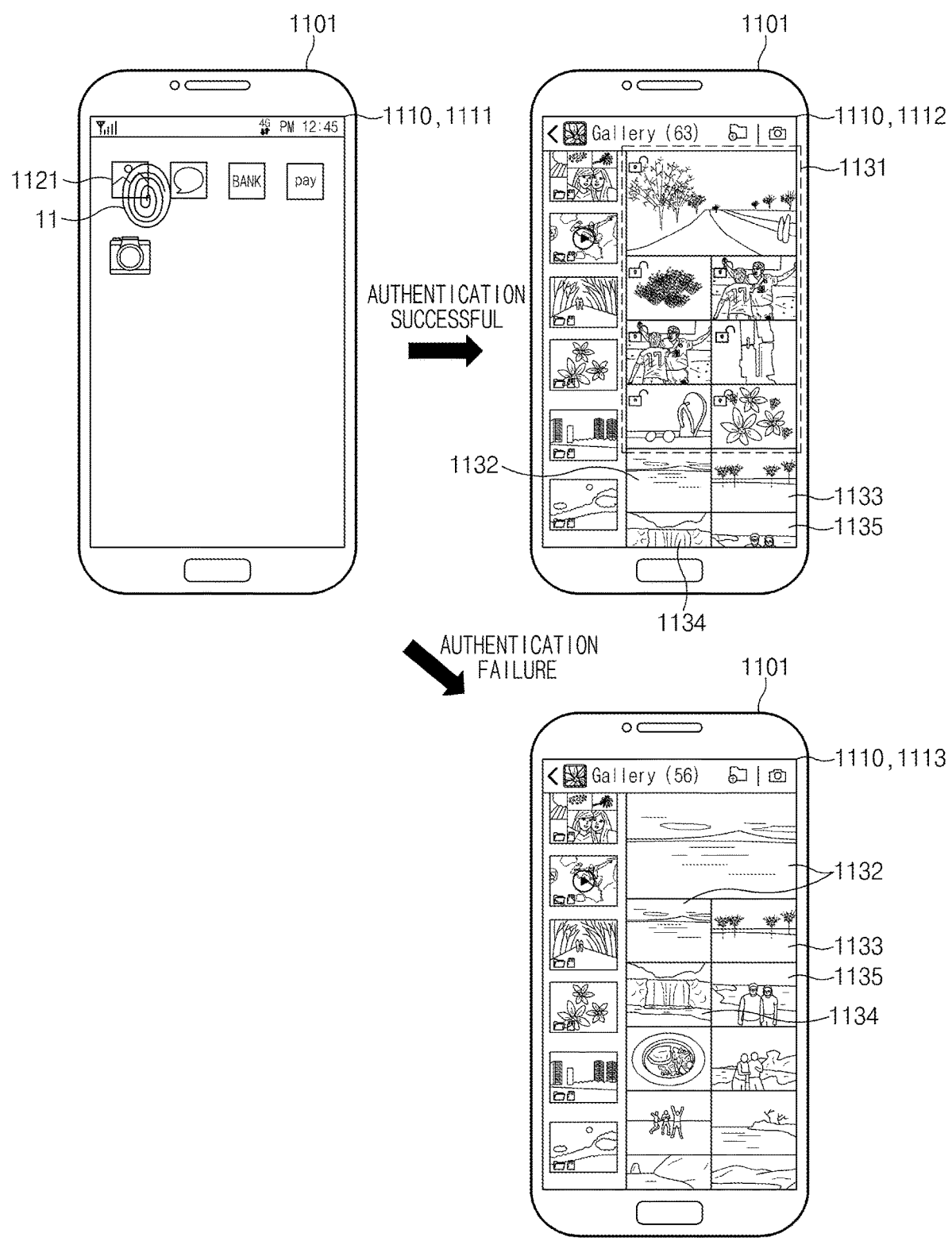
FIG. 11 illustrates a fingerprint verification method applied to an image viewer application according to an embodiment of the present disclosure.

FIG. 11 illustrates a fingerprint verification method applied to an image viewer application, according to an embodiment of the present disclosure.

Referring to FIG. 11, according to an embodiment of the present disclosure, a home screen 1111 including a plurality of application icons may be output to a (touchscreen) display 1110 of an electronic device 1101.

For example, the electronic device 1101 may receive a force touch 11 to a position, to which an icon 1121 of the image viewer application is output, on the (touchscreen) display 1010. When the force touch 11 is made on the display 1110, the electronic device 1101 may activate a fingerprint sensor based on pressure of the force touch 11. The electronic device 1101 may detect the fingerprint of the finger, which makes the force touch 11, using the activated fingerprint sensor. The electronic device 1101 may compare the detected fingerprint with a registered fingerprint stored in a memory.

For example, when the detected fingerprint is matched with the registered fingerprint (i.e. when the fingerprint is successfully verified), the electronic device 1101 may withdraw a security policy set by the image view application, and may output a screen 1112 in which the security policy is withdrawn (one example of a first function). For example, the electronic device 1101 may display not only a plurality of images 1131, to which a security policy set by a user in advance is applied, but also images 1132, 1133, 1134, and 1135, to which the security policy is not applied, on the screen 1112. In other words, a badge in the shape of a released lock may be added to the images 1131 to represent that the security policy is set to the images 1131 (which may be called a "secret mode").

Alternatively, when the fingerprint fails to be verified, the electronic device 1101 maintains a security policy set by the image viewer application, and may output a screen 1113 in which the security policy is maintained (one example of a second function). For example, differently from the screen 1112, the images 1131, to which the security policy is set, are not displayed on the screen 113, but only images 1132, 1133, 1134, and 1135, to which the security policy is not applied, are displayed on the screen 113 (which is "normal mode").

According to the description with reference to FIG. 11, the images 1131, to which the security policy is set, are not displayed on the display 1110 when the fingerprint fails to be verified. However, this disclosure is not limited thereto. According to various embodiments of the present disclosure, when the fingerprint fails to be verified, the images 1131, to which the security policy is set, may be displayed with downscaled resolution, at least a portion of the images 1131 may not be displayed, or the images 1131 may be processed and displayed with mosaics.

Figure 12:
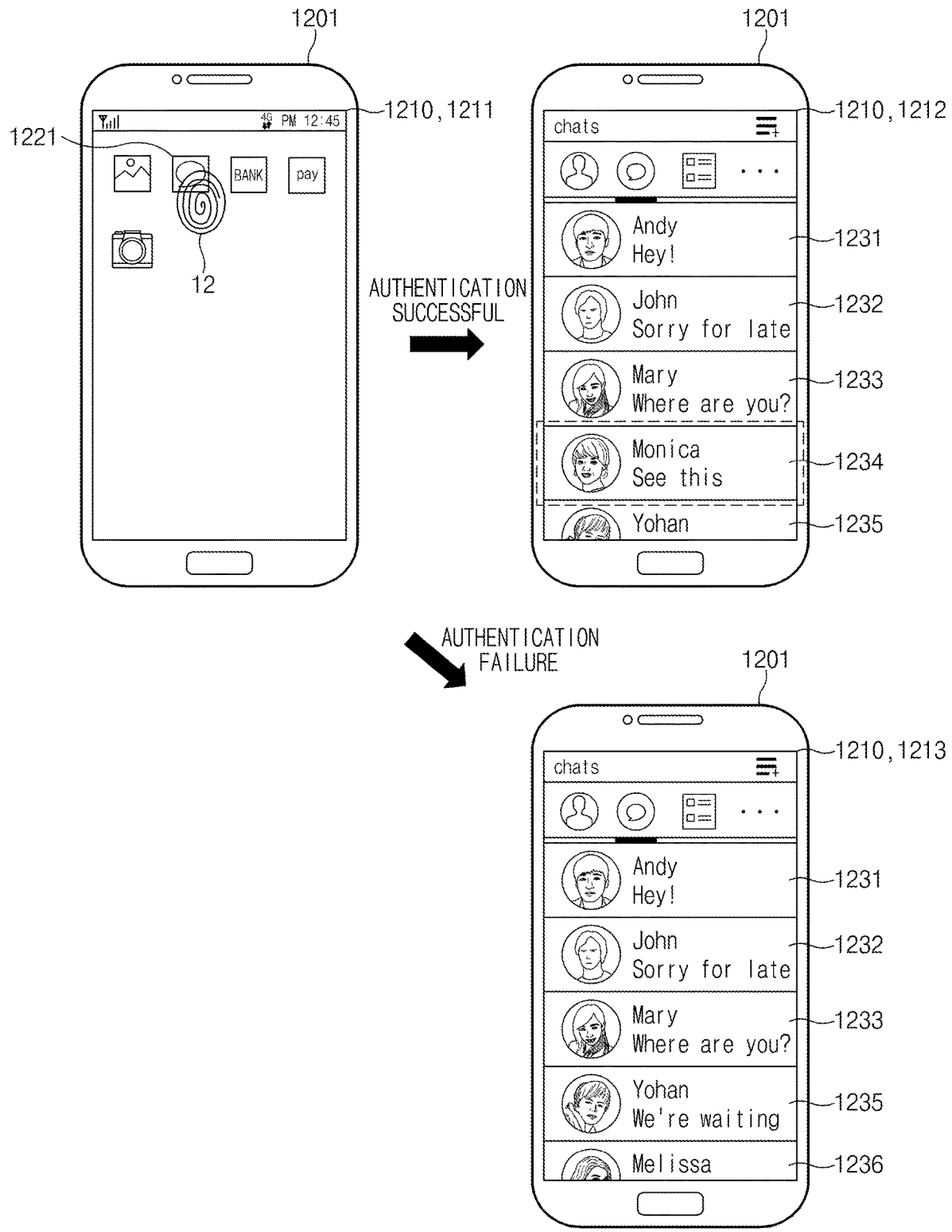
FIG. 12 illustrates a fingerprint verification method applied to an instant message (IM) application according to an embodiment of the present disclosure.

FIG. 12 illustrates a fingerprint verification method applied to an instant message (IM) application, according to an embodiment of the present disclosure.

Referring to FIG. 12, according to an embodiment of the present disclosure, a home screen 1211 including a plurality of application icons may be output to a (touchscreen) display 1210 of an electronic device 1201.

For example, the electronic device 1201 may receive a force touch 12 made on a position, to which an IM application icon 1221 is output, on the (touchscreen) display 1210. When the force touch 12 is made on the display 1210, the electronic device 1201 may activate a fingerprint sensor based on pressure of the force touch 21. The electronic device 1201 may detect the fingerprint of the finger, which makes the force touch 12, using the activated fingerprint sensor. The electronic device 1201 may compare the detected fingerprint with a registered fingerprint stored in a memory.

For example, when the detected fingerprint is matched with the registered fingerprint (i.e. when the fingerprint is successfully verified), the electronic device 1201 may withdraw a security policy set by the IM application, and may output a screen 1212 in which the security policy is withdrawn (one example of a first function). For example, the electronic device 1201 may display a chat window object 1234, to which a security policy set by a user in advance is applied, and chat window objects 1231, 1232, 1233, and 1235, to which the security policy is not applied, on the screen 1212 (which may be called a "secret mode").

Alternatively, when the fingerprint fails to be verified, the electronic device 1201 maintains the security policy set by the IM application, and may output a screen 1213 in which the security policy is maintained (one example of a second function). For example, differently from the screen 1212, the chat window object 1234, to which the security policy is set, is not displayed on the screen 1213, but only chat window objects 1231, 1232, 1233, 1235 and 1236, to which the security policy is not applied, may be displayed on the screen 1213 (which is "normal mode").

Figure 13:
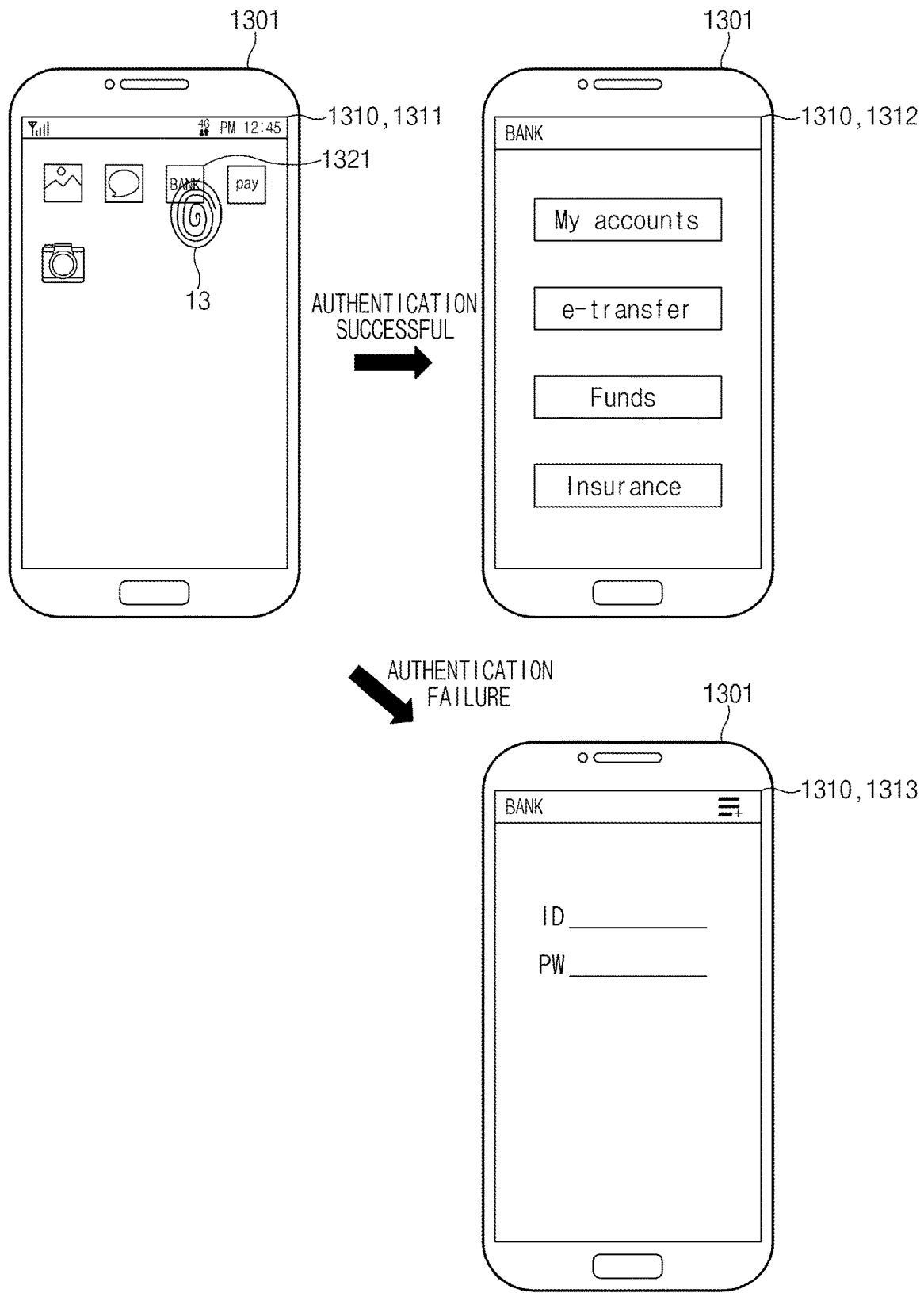
FIG. 13 illustrates a fingerprint verification method applied to a financial application according to an embodiment of the present disclosure.

FIG. 13 illustrates a fingerprint verification method applied to a financial application according to an embodiment of the present disclosure.

Referring to FIG. 13, according to an embodiment of the present disclosure, a home screen 1311 including a plurality of application icons may be output to a (touchscreen) display 1310 of an electronic device 1301.

For example, the electronic device 1301 may receive a force touch 13 made on a position, to which an icon 1321 of a financial application (e.g., internet banking application) is output, on the (touchscreen) display 1310. When the force touch 13 is made on the display 1310, the electronic device 1301 may activate a fingerprint sensor based on pressure of the force touch 13. The electronic device 1310 may detect the fingerprint of the finger, which makes the force touch 13, using the activated fingerprint sensor. The electronic device 1301 may compare the detected fingerprint with a registered fingerprint stored in a memory.

For example, when the detected fingerprint is matched with the registered fingerprint (i.e. when the fingerprint is successfully verified), the electronic device 1301 may withdraw a security policy set by the financial application, and may output a screen 1312 in which the security policy is withdrawn (one example of a first function). For example, the screen 1312 may include menu objects in which a security policy is set in advance by a financial institution. As the menu objects included in the screen 1312 are selected, a user may inquire account information held by the user, or may transfer money on line.

Alternatively, when the fingerprint fails to be verified, the electronic device 1301 maintains the security policy set by the financial application, and may output a screen 1313 in which the security policy is maintained (one example of a second function). For example, differently from the screen 1312, the screen 1313, may be displayed with the security policy (further requirement of authentication) set. For example, the screen 1313 may be displayed with the request for an identifier (ID) and a password, and a user may use the financial application by inputting an ID and a password of the user into the screen 1313. For example, when the user inputs the ID and the password into the screen 1313, and the user logs in, the screen 1312 may be output.

Figure 14:
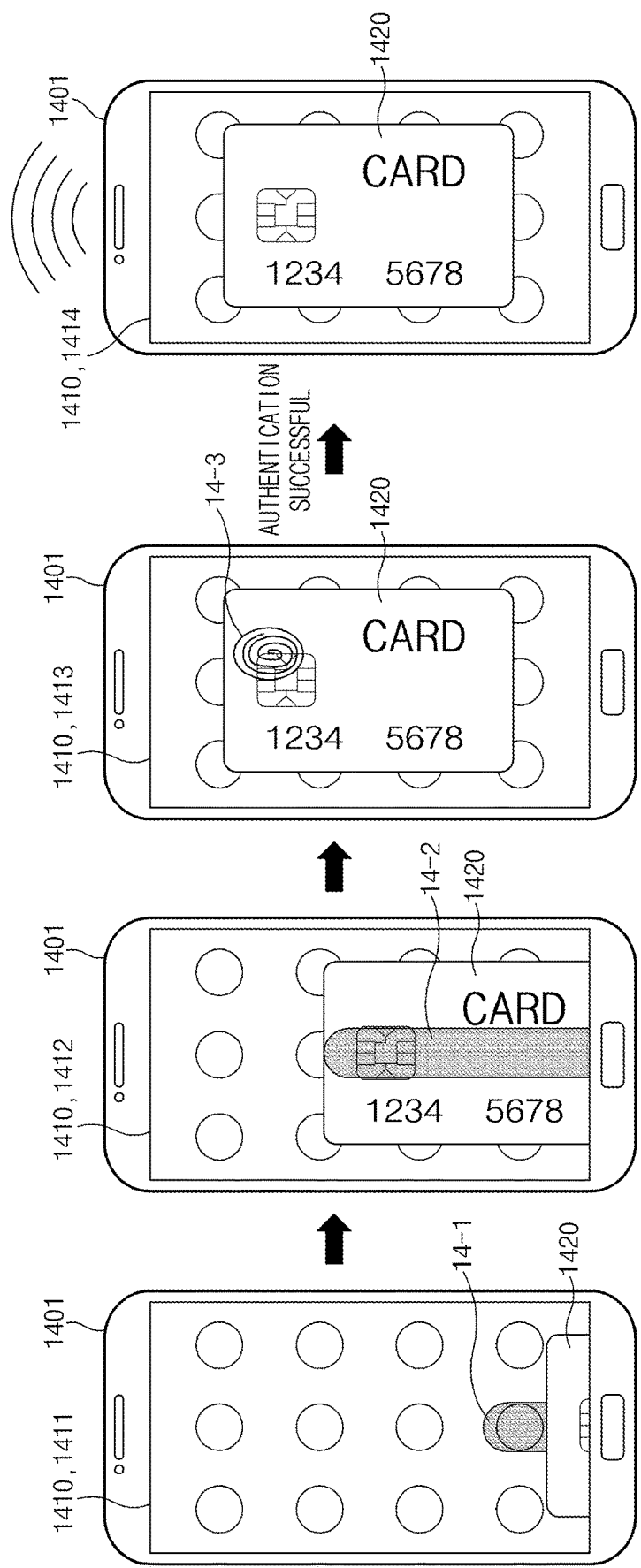
FIG. 14 illustrates a fingerprint verification method applied to a payment application according to an embodiment of the present disclosure.

FIG. 14 illustrates a fingerprint verification method applied to a payment application according to an embodiment of the present disclosure.

Referring to FIG. 14, according to an embodiment of the present disclosure, a home screen 1411 including a plurality of application icons may be output to a (touchscreen) display 1410 of an electronic device 1401.

For example, the electronic device 1401 may receive a touch swipe 14-1, which is performed inward from a lower end of the home screen 1411, from a user. As the payment application (e.g., Samsung Pay) is executed by the touch swipe 14-1, a graphic user interface (GUI) object 1420 may be displayed on the lower end of the home screen 1411.

According to various embodiments of the present disclosure, referring to a screen 1412, subsequently to the touch swipe 14-1, a touch swipe 14-2 may be performed with respect to the GUI object 1420. In this case, the user's finger (e.g., thumb finger) may not be separated from the display 1410 while the touch swipe 14-2 is performed. The GUI object 1420 may be disposed at the center of the screen 1412 through the touch swipe 14-2.

When the GUI object 1420 is disposed at the center of the screen 1412, a force touch 14-3 may be instantly made by the finger which has performed the touch swipe 14-2. When the force touch 14-3 is made on the display 1410, the electronic device 1401 may activate a fingerprint sensor based on the pressure of the force touch 14-3. The fingerprint of the finger, which has performed the force touch 14-3, may be detected by the activated fingerprint sensor. The electronic device 1401 may compare the detected fingerprint with a registered fingerprint stored in a memory.

For example, when the detected fingerprint is matched with the registered fingerprint (i.e. when the fingerprint is successfully verified), the electronic device 1401 may withdraw a security policy set by the payment application (one example of a first function). For example, referring to a screen 1414, the electronic device 1401 may withdraw the security policy and may operate a near field communication (NFC) module or a magnetic strip transmission (MST) module embedded in the electronic device 1401. The NFC module or the MST module may generate a magnetic field or an electro-magnetic field to transmit payment information (e.g., a credit card number or the like) to another electronic device (e.g., a point of sale (POS) device of a credit card member store).

Alternatively, when the fingerprint fails to be verified, the electronic device 1401 may maintain the security policy set by the payment application, and may output a screen 1413 in which the security policy is maintained (one example of a second function). For example, the electronic device 1401 may temporarily output the screen 1413 with a warning that the detected fingerprint is not matched with the registered fingerprint, a notice of further requiring authentication, or a notice of causing a user to verify the fingerprint.

According to various embodiments of the present disclosure, the touch swipes 14-1 and 14-2 may be skipped. For example, an area for the execution of the payment application may be specified in a lower end portion (soft keys at lower ends of the display 1410 and the housing) of the electronic device 1401 in advance. When the force touch is made to the area specified in advance, the electronic device 1401 may verify a fingerprint. When the fingerprint is successfully verified, the electronic device 1401 may withdraw the security policy and may operate the NFC module or the MST module embedded in the electronic device 1401 such that the payment is achieved. In addition, for example, even if a force touch is made to an icon of the payment application included in the home screen 1411, the payment may be achieved in a similar manner.

Figure 15:
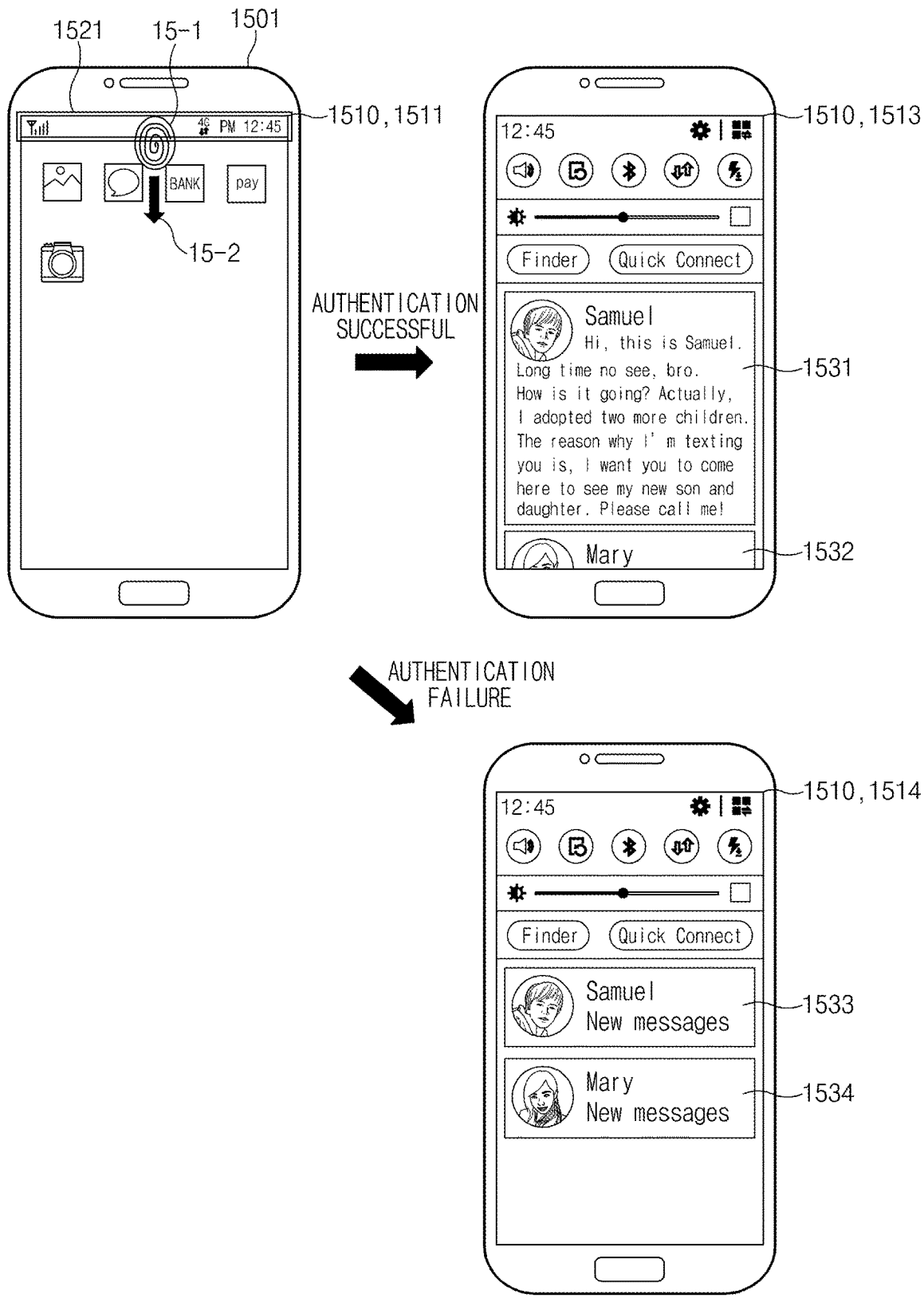
FIG. 15 illustrates a fingerprint verification method applied to a status bar according to an embodiment of the present disclosure.

FIG. 15 illustrates a fingerprint verification method applied to a status bar according to an embodiment of the present disclosure.

Referring to FIG. 15, according to an embodiment of the present disclosure, a home screen 1511 including a status bar 1521 and/or a plurality of application icons may be output to a (touchscreen) display 1510 of an electronic device 1501.

For example, the electronic device 1501 may receive a force touch 15-1 made to a position, to which the status bar 1521 is output, on the home screen 1511. Then, a touch swipe 15-2 may be performed subsequently to the force touch 15-1. Although FIG. 15 illustrates that the touch swipe 15-2 is performed downward on the home screen 1511, this disclosure is not limited to the swipe direction. In other words, the touch swipe 15-2 may be performed in various directions, for example, upward, a left-right direction, or the like, and the directionality of the touch swipe may be applied to a touch move.

For example, when the force touch 15-1 is made on the display 1510, the electronic device 1501 may activate a fingerprint sensor based on the pressure of the force touch 15-1. The electronic device 1501 may detect the fingerprint of the finger, which makes the force touch 15-1, using the activated fingerprint sensor. The electronic device 1501 may compare the detected fingerprint with a registered fingerprint stored in a memory.

For example, when the detected fingerprint is matched with the registered fingerprint (i.e. when the fingerprint is successfully verified), the electronic device 1501 may withdraw a security policy set on the status bar 1521. In addition, when the touch swipe 15-2 is performed subsequently to the force touch 15-1, the electronic device 1501 may output the screen 1513 in which the security policy is withdrawn (one example of the first function). For example, a quick-panel may be displayed on the screen 1513, and notification objects 1531 and 1532 including detailed content may be displayed on the quick-panel.

Alternatively, when the fingerprint fails to be verified, the electronic device 1501 may maintain the security policy set on the status bar 1521. In addition, when the touch swipe 15-2 is performed subsequently to the force touch 15-1, the electronic device 1501 may output a screen 1514 in which the security policy is maintained (one example of a second function). For example, the quick-panel may be displayed on the screen 1514, and notification objects 1533 and 1534 including brief content may be displayed on the quick-panel.

As described above, according to an embodiment of the present disclosure, the electronic device may include a housing including a first surface facing in a first direction, and a second surface facing in a second direction opposite from the first direction, a touchscreen display interposed between the first and second surfaces and exposed through the first surface, a pressure sensor interposed between the first and second surfaces, in which the pressure sensor is positioned to sense pressure of an external object against the display, a fingerprint sensor interposed between the first and second surfaces and positioned to detect a fingerprint on at least a portion of the display, a processor positioned inside the housing and electrically coupled to the display, the pressure sensor, and the fingerprint sensor, and a memory positioned inside the housing and electrically coupled to the processor, in which the memory stores at least one registered fingerprint. The memory may store instructions that, when executed, cause the processor to sense pressure of a user's finger against the display using the pressure sensor, upon sensing of the pressure, activate the fingerprint sensor, detect a fingerprint of the finger using the fingerprint sensor, determine whether the detected fingerprint is matched with the registered fingerprint, and perform a preselected function without further requiring authentication, when the detected fingerprint is matched with the registered fingerprint.

According to another embodiment of the present disclosure, the instructions may further cause the processor to sense the pressure of the finger against the display using the pressure sensor while the display is turned off.

According to another embodiment of the present disclosure, the instructions may further cause the processor to sense the pressure of the finger against the display using the pressure sensor while the electronic device is in a locked state. The preselected function may be unlocking the electronic device.

According to another embodiment of the present disclosure, the instructions may further cause the processor to sense the pressure of the finger against the display using the pressure sensor while the display is turned on.

According to another embodiment of the present disclosure, the instructions may further cause the processor to execute a function of an application without further requiring authentication, when the pressure of the finger is applied to an object of the application output to the display.

According to an embodiment of the present disclosure, an electronic device may include a touchscreen display, a pressure sensor positioned to sense pressure applied to the display by a user's finger, a fingerprint sensor positioned to detect a fingerprint of the finger, a processor electrically coupled to the display, the pressure sensor, and the fingerprint sensor, and a memory electrically coupled to the processor and positioned to store at least one registered fingerprint. The processor may be configured to sense the pressure, which is applied to the display by the finger, using the pressure sensor, activate the fingerprint sensor when the sensed pressure is equal to or greater than a designated value, detect the fingerprint of the finger using the fingerprint sensor, compare the detected fingerprint with the registered fingerprint, perform a first function when the detected fingerprint is matched with the registered fingerprint, and perform a second function different from the first function when the detected fingerprint is not matched with the registered fingerprint.

According to another embodiment of the present disclosure, the processor may scan a specified area including a position, to which the pressure is applied, on the display using the fingerprint sensor, and may detect the fingerprint within the specified area.

According to another embodiment of the present disclosure, the processor may sense the pressure applied to the display using the pressure sensor, while a locked screen is output to the display. The first function may include a function of outputting an unlocked screen to the display, and the second function may include a function of maintaining the locked screen.

According to another embodiment of the present disclosure, the processor may sense the pressure, which is applied to the display, using the pressure sensor, while the display is turned off. The first function may include a function of switching a state of the display to an ON state, and the second function may include a function of maintaining the display in the OFF state.

According to another embodiment of the present disclosure, the first function may further include a function of outputting an unlocked screen to the display.

According to another embodiment of the present disclosure, the first function may further include a function of outputting a screen including specified information to the display.

According to another embodiment of the present disclosure, a position, to which the pressure is applied, on the display, may correspond to a position, to which an object associated with a specified application is output, on the display. The first function may include a function of withdrawing a security policy set by the specified application, and the second function may include a function of maintaining the security policy set by the specified application.

According to another embodiment of the present disclosure, the first function may further include a function of outputting a screen, in which the security policy is withdrawn, to the display, and the second function further includes a function of outputting a screen, in which the security policy is maintained, to the display.

According to another embodiment of the present disclosure, the specified application may include at least a payment application, a financial application, or an image viewer application.

According to an embodiment of the present disclosure, a fingerprint verification method of an electronic device may include sensing pressure of a user's finger against a touchscreen display, activating a fingerprint sensor upon sensing of the pressure, detecting a fingerprint of the finger using the fingerprint sensor, determining whether the detected fingerprint is matched with a registered fingerprint stored in the electronic device, and performing a preselected function without further requiring authentication, when the detected fingerprint is matched with the registered fingerprint.

According to another embodiment of the present disclosure, the sensing of the pressure of the finger may be performed while the display is turned off.

According to another embodiment of the present disclosure, the sensing of the pressure of the finger may be performed while the electronic device is in a locked state, and the preselected function may correspond to a function of unlocking the locked state.

According to another embodiment of the present disclosure, the sensing of the pressure of the finger may be performed while the display is turned on.

According to another embodiment of the present disclosure, the sensing of the pressure of the finger may include sensing pressure applied to an object of an application output to the display, and the performing of the preselected function may include executing a function of the application without further requiring the authentication.

According to an embodiment of the present disclosure, a fingerprint verification method of an electronic device may include sensing pressure, which is applied to a touchscreen display by a user's finger, using a pressure sensor, activating a fingerprint sensor when the sensed pressure is equal to or greater than a designated value, detecting a fingerprint of the finger using the fingerprint sensor, comparing the detected fingerprint with a registered fingerprint stored in a memory, performing a first function when the detected fingerprint is matched with the registered fingerprint, and performing a second function different from the first function when the detected fingerprint is not matched with the registered fingerprint.

According to another embodiment of the present disclosure, the detecting of the fingerprint may include scanning a specified area around a position, to which the pressure is applied, on the display and detecting the fingerprint within the specified area.

According to another embodiment of the present disclosure, the sensing of the pressure may be performed while a locked screen is output to the display. The first function may include a function of outputting an unlocked screen to the display, and the second function may include a function of maintaining the locked screen.

According to another embodiment of the present disclosure, the sensing of the pressure may be performed while the display is turned off. The first function may include a function of switching a state of the display to an ON state, and the second function may include a function of maintaining the display in an OFF state.

According to another embodiment of the present disclosure, the first function may further include a function of outputting an unlocked screen to the display.

According to another embodiment of the present disclosure, a position, to which the pressure is applied, on the display, may correspond to a position, to which an object associated with a specified application is output, on the display. The first function may include a function of withdrawing a security policy set by the specified application. The second function may include a function of maintaining the security policy set by the specified application.

According to another embodiment of the present disclosure, the first function may further include a function of outputting a screen, in which the security policy is withdrawn, to the display, and the second function may further include a function of outputting a screen, in which the security policy is maintained, to the display.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120 of FIG. 1), may cause the one or more processors to perform a function corresponding to the instruction. The computer-readable storage media, for example, may be the memory 130 of FIG. 1.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random-access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to various embodiments disclosed in this disclosure, when the pressure sensor detects a touch having a designated pressure value or more, a user may activate the fingerprint sensor and may authenticate the fingerprint of a finger which makes the touch. Accordingly, various existing manipulation processes, which have been performed to verify the fingerprint, may be reduced. In addition, various effects may be directly or indirectly ascertained through this disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
    a touchscreen display;
    a fingerprint sensor disposed below the touchscreen display;
    a pressure sensor disposed below the touchscreen display;
    a memory to store a plurality of registered fingerprint information; and
    a processor configured to:
        while the portable communication device is in an unlocked state and an application to which a security policy is applied is in a locked state, acquire, using the pressure sensor, pressure information corresponding to an external object in contact with an area of the touchscreen display,
        while the unlocked state of the portable communication device is maintained and the locked state of the application is maintained, obtain, using the fingerprint sensor, fingerprint information corresponding to the external object based at least in part on a determination that the pressure information satisfies a specified condition of pressure,
        determine whether the obtained fingerprint information corresponds to at least one registered fingerprint information of the plurality of registered fingerprint information,
        transition the application from the locked state to an unlock state, based at least in part on a determination that the obtained fingerprint information corresponds to the at least one registered fingerprint information, the transitioning of the application including displaying an execution screen corresponding to the application via the touchscreen display, and
        maintain the locked state of the application based at least in part on a determination that the obtained fingerprint information does not correspond to the at least one registered fingerprint information.

2. The portable communication device of claim 1, wherein the processor is adapted to:
    display an icon to be used to obtain the fingerprint information in the area of the touchscreen display, receive, via the touchscreen display, a touch input with respect to the icon, and detect, using the pressure sensor, an intensity of pressure corresponding to the touch input, as at least part of the pressure information.

3. The portable communication device of claim 1, wherein the pressure sensor includes a first electrode, a second electrode, and a dielectric layer disposed between the first electrode and the second electrode, and wherein the processor is adapted to:

perform the acquiring of the pressure information based at least in part on a capacitance between the first electrode and the second electrode.

4. The portable communication device of claim 1, wherein the processor is adapted to:

activate the fingerprint sensor based at least in part on the determination that the pressure information satisfies the specified condition of pressure.

5. The portable communication device of claim 1, wherein the fingerprint sensor includes an optical fingerprint sensor, and wherein the processor is adapted to:

perform, using the optical fingerprint sensor, the obtaining of the fingerprint information based at least in part on light reflected by the external object.

6. The portable communication device of claim 1, wherein the memory adapted to a plurality of applications, and wherein the processor is adapted to:

select at least one application from the plurality of applications as the application to which the security policy is applied, based at least in part on a user selection.

7. The portable communication device of claim 1, wherein the processor is adapted to:

as part of the maintaining of the locked state of the application, display an user interface to request another authentication information having a type different from that of the fingerprint information.

8. The portable communication device of claim 1, wherein the processor is adapted to:

as part of the maintaining of the locked state of the application, display another execution screen corresponding to the application via the touchscreen display, the displaying of the other execution screen including hiding specified part of information to be displayed in the execution screen.

9. A portable communication device comprising:

a touchscreen display;

a sensor module disposed below the touchscreen display, adapted to detect a plurality of information corresponding to an external object in proximity of or in contact with the touchscreen display, and including a pressure sensing portion corresponding to pressure information of the plurality of information and a fingerprint sensing portion corresponding to fingerprint information of the plurality of information;

a memory to store a plurality of registered fingerprint information; and a processor adapted to:

obtain the pressure information using the pressure sensing portion of the sensor module, obtain, using the fingerprint sensing portion of the sensor module, the fingerprint information based at least in part on a determination that the pressure information satisfies a specified condition of pressure, determine whether the obtained fingerprint information corresponds to at least one registered fingerprint information of the plurality of registered fingerprint information, and perform a specified function based at least in part on a determination that obtained the fingerprint information corresponds to the at least one registered fingerprint information.

10. The portable communication device of claim 9, wherein the processor is adapted to:

perform the obtaining of the pressure while the touchscreen display is inactive state.

11. The portable communication device of claim 9, wherein the processor is adapted to:

display an icon to be used to obtain the fingerprint information in an area of the touchscreen display, receive, via the touchscreen display, a touch input with respect to the icon, and detect, using the pressure sensor, an intensity of pressure corresponding to the touch input, as at least part of the pressure information.

12. The portable communication device of claim 9, wherein the pressure sensing portion includes a first electrode, a second electrode, and a dielectric layer disposed between the first electrode and the second electrode, and wherein the processor is adapted to:

perform the obtaining of the pressure information based at least in part on a capacitance between the first electrode and the second electrode.

13. The portable communication device of claim 9, wherein the fingerprint sensing portion includes an optical fingerprint sensor, and wherein the processor is adapted to:

perform, using the optical fingerprint sensor, the obtaining of the fingerprint information based at least in part on light reflected by the external object.

14. The portable communication device of claim 9, wherein the processor is adapted to:

activate the fingerprint sensor portion based at least in part on the determination that the pressure information satisfies the specified condition of pressure.

15. The portable communication device of claim 9, wherein the processor is adapted to:

transition a screen of the touchscreen display from lock screen to home screen based at least in part on the determination that obtained the fingerprint information corresponds to the at least one registered fingerprint information.

16. The portable communication device of claim 9, wherein the processor is adapted to:

transition the application from the locked state to an unlock state, based at least in part on the determination that the obtained fingerprint information corresponds to the at least one registered fingerprint information as part of the specified function, the transitioning of the application including displaying an execution screen corresponding to the application via the touchscreen display.

17. The portable communication device of claim 16, wherein the processor is adapted to:

maintain the locked state of the application based at least in part on a determination that the obtained fingerprint information does not correspond to the at least one registered fingerprint information.

18. A non-transitory machine-readable storage device storing instructions that, when executed by one or more processors, cause the one or more processors to perform operations comprising:
- while the portable communication device is in an unlocked state and an application to which a security policy is applied is in a locked state, acquiring pressure information corresponding to an external object in contact with an area of a touchscreen display operatively coupled with the one or more processors;
- while the unlocked state of the portable communication device is maintained and the locked state of the application is maintained, obtaining, using a fingerprint sensor being disposed below the touchscreen display and operatively coupled with the one or more processors, fingerprint information corresponding to the external object based at least in part on a determination that the pressure information satisfies a specified condition of pressure;
- determining whether the obtained fingerprint information corresponds to at least one registered fingerprint information of the plurality of registered fingerprint information;
- transitioning the application from the locked state to an unlock state, based at least in part on a determination that the obtained fingerprint information corresponds to the at least one registered fingerprint information, the transitioning of the application including displaying an execution screen corresponding to the application via the touchscreen display; and
- maintaining the locked state of the application based at least in part on a determination that the obtained fingerprint information does not correspond to the at least one registered fingerprint information.

19. The non-transitory machine-readable storage device of claim 18, wherein the obtaining of the fingerprint information further comprises:
- activating the fingerprint sensor based at least in part on the determination that the pressure information satisfies the specified condition of pressure.

20. The non-transitory machine-readable storage device of claim 18, wherein the maintaining of the locked state of the application further comprises:
- displaying an user interface to request another authentication information having a type different from that of the fingerprint information.

* * * * *